US008673260B2

(12) United States Patent
Plass

(10) Patent No.: US 8,673,260 B2
(45) Date of Patent: Mar. 18, 2014

(54) DEVELOPMENT OF EARTH-ABUNDANT MIXED-METAL SULFIDE NANOPARTICLES FOR USE IN SOLAR ENERGY CONVERSION

(71) Applicant: Franklin and Marshall College, Lancaster, PA (US)

(72) Inventor: Katherine Plass, Lancaster, PA (US)

(73) Assignee: Franklin and Marshall College, Lancaster, PA (US)

( * ) Notice: Subject to any disclaimer, the term of this patent is extended or adjusted under 35 U.S.C. 154(b) by 0 days.

(21) Appl. No.: 13/734,585

(22) Filed: Jan. 4, 2013

(65) Prior Publication Data

US 2013/0171056 A1 Jul. 4, 2013

Related U.S. Application Data

(60) Provisional application No. 61/582,973, filed on Jan. 4, 2012.

(51) Int. Cl.

| | |
|---|---|
| ***B65D 25/00*** | (2006.01) |
| ***C01B 17/20*** | (2006.01) |
| ***C09K 11/08*** | (2006.01) |
| ***H01B 1/10*** | (2006.01) |

(52) U.S. Cl.

USPC ........ 423/508; 423/511; 423/561.1; 423/565; 252/519.4; 252/301.4 S; 252/301.4 F; 252/501.1; 977/773; 977/774; 977/813; 977/824; 206/219

(58) Field of Classification Search

USPC ............ 423/508, 511, 561.1, 565; 252/519.4, 252/301.4 S, 301.4 F, 501.1; 977/773, 774, 977/813, 824; 206/219

See application file for complete search history.

(56) References Cited

U.S. PATENT DOCUMENTS

| | | | | |
|---|---|---|---|---|
| 5,427,716 | A | 6/1995 | Morita | |
| 8,022,410 | B2 | 9/2011 | Jeon et al. | |
| 8,158,880 | B1 | 4/2012 | Girt et al. | |
| 2008/0092945 | A1 | 4/2008 | Munteanu et al. | |
| 2008/0092946 | A1 | 4/2008 | Munteanu et al. | |
| 2009/0239073 | A1* | 9/2009 | Huang et al. | 428/402 |
| 2010/0006849 | A1 | 1/2010 | Jeon et al. | |
| 2011/0294268 | A1 | 12/2011 | Jeon et al. | |
| 2012/0036963 | A1 | 2/2012 | George et al. | |
| 2012/0045387 | A1* | 2/2012 | Huang et al. | 423/561.1 |
| 2012/0192936 | A1 | 8/2012 | Girt et al. | |
| 2012/0220066 | A1* | 8/2012 | Cao | 438/73 |
| 2013/0125988 | A1* | 5/2013 | Cao et al. | 136/264 |

OTHER PUBLICATIONS

Regulacio, M. D.; Han, M. Y., Composition-Tunable Alloyed Semiconductor Nanocrystals. Acc. Chem. Res. 2010, 43, 621-630.

Riha, S. C.; Parkinson, B. A.; Prieto, A. L., Solution-Based Synthesis and Characterization of Cu2ZnSnS4 Nanocrystals. J. Am. Chem. Soc. 2009, 131, 12054-12055.

Sadtler, B.; Demchenko, D. P.; Zheng, H.; Hughes, S. M.; Merkle, M. G.; Dahmen, U.; Wang, L. W.; Alivisatos, A. P., Selective Facet Reactivity during Cation Exchange in Cadmium Sulfide Nanorods. J. Am. Chem. Soc. 2009, 131, 5285-5293.

Salinas-Estevane, P.; Sanchez, E. M., Preparation of Sb2S3 nanostructures by the [BMIM][BF4] ionic liquid assisted low power sonochemical method. Mater. Lett. 2010, 64, 2627-2630.

Shockley, W.; Queisser, H. J., Detailed Balance Limit of Efficiency of p-n Junction Solar Cells. J. Appl. Phys. 1961, 32, 510-519.

Sigman, M. B.; Korgel, B. A., Solventless synthesis of Bi2S3 (Bismuthinite) Nanorods, Nanowires, and Nanofabric. Chem. Mater. 2005, 17, 1655-1660.

Smith, A. M.; Nie, S. M., Bright and Compact Alloyed Quantum Dots with Broadly Tunable Near-Infrared Absorption and Fluorescence Spectra through Mercury Cation Exchange. J. Am. Chem. Soc. 2011, 133, 24-26.

Smith, D. K.; Luther, J. M.; Semonin, O. E.; Nozik, A. J.; Beard, M. C., Tuning the Synthesis of Ternary Lead Chalcogenide Quantum Dots by Balancing Precursor Reactivity. ACS Nano 2011, 5, 183-190.

Steinhagen, C.; Panthani, M. G.; Akhavan, V.; Goodfellow, B.; Koo, B.; Korgel, B. A., Synthesis of Cu2ZnSnS4 Nanocrystals for Use in Low-Cost Photovoltaics. J. Am. Chem. Soc. 2009, 131, 12554-12555.

Swihart, M. T.; Yong, K. T.; Sahoo, Y.; Prasad, P. N., Shape Control of CdS Nanocrystals in One-Pot Synthesis. J. Phys. Chem. C 2007, 111, 2447-2458.

Tang, J.; Hinds, S.; Kelley, S. O.; Sargent, E. H., Synthesis of Colloidal CuGaSe2, CuInSe2, and Cu(InGa)Se-2 Nanoparticles. Chem. Mater. 2008, 20, 6906-6910.

Tang, X. S.; Cheng, W. L.; Choo, E. S. G.; Xue, J. M., Synthesis of CuInS2-ZnS alloyed nanocubes with high luminescence. Chem. Commun. 2011, 47, 5217-5219.

Taniguchi, S.; Green, M.; Lim, T., The Room-Temperature Synthesis of Anisotropic CdHgTe Quantum Dot Alloys: A "Molecular Welding" Effect. J. Am. Chem. Soc. 2011, 133, 3328-3331.

Tate, J.; Newhouse, P. F.; Kykyneshi, R.; Hersh, P. A.; Kinney, J.; McIntyre, D. H.; Keszler, D. A., Chalcogen-based transparent conductors. Thin Solid Films 2008, 516, 5795-5799.

Vogel, R.; Hoyer, P.; Weller, H., Quantum-Sized PbS, CdS, Ag2S, Sb2S3, and Bi2S3 Particles as Sensitizers for Various Nanoporous Wide-Bandgap Semiconductors. J. Phys. Chem. 1994, 98, 3183-3188.

Wadia, C.; Alivisatos, A. P.; Kammen, D. M., Materials Availability Expands the Opportunity for Large-Scale Photovoltaics Deployment. Environ. Sci. Technol. 2009, 43, 2072-2077.

(Continued)

*Primary Examiner* — Timothy Vanoy
(74) *Attorney, Agent, or Firm* — Barley Snyder

(57) ABSTRACT

This invention relates to a process for the phase-controlled synthesis of ternary and quaternary mixed-metal sulfide nanoparticles by reacting soft metal ions with hard metal ions in a high-boiling organic solvent in the presence of a complexing and activating ligands to control the reactivity of the metal ions. Ternary and quaternary mixed metal sulfides nanoparticles of copper, sulfur, and iron, aluminum, tin, and silicon are preferred. This invention also relates to the phase controlled preparation of polymorphs of bornite nanoparticles and the phase controlled preparation of stabilized α- and γ-chalconite nanoparticles.

23 Claims, 4 Drawing Sheets

(56) References Cited

OTHER PUBLICATIONS

Wang, X. L.; Pan, D. C.; Weng, D.; Low, C.Y.; Rice, L.; Han, J.Y.; Lu, Y. F., A General Synthesis of Cu-In-S Based Multicomponent Solid-Solution Nanocrystals with Tunable Band Gap, Size, and Structure. J. Phys. Chem. C 2010, 114, 17293-17297.

Watt, A. A. R.; Blake, D.; Warner, J. H.; Thomsen, E. A.; Tavenner, E. L.; Rubinsztein-Dunlop, H.; Meredith, P., Lead sulfide nanocrystal: conducting polymer solar cells. J. Phys. D: Appl. Phys. 2005, 38, 2006-2012.

Wiltrout, A. M.; Machani, T.; Rossi, D. P.; Plass, K. E., Phase-Selective Synthesis of Bornite Nanoparticles. J. Mater. Chem., 2011, 21, 19286-19292.

Wooten, A. J.; Werder, D. J.; Williams, D. J.; Casson, J. L.; Hollingsworth, J. A., Solution-Liquid-Solid Growth of Ternary Cu-In-Se Semiconductor Nanowires from Multiple- and Single-Source Precursors. J. Am. Chem. Soc. 2009, 131, 16177-16188.

Wu, Y.; Wadia, C.; Ma, W. L.; Sadtler, B.; Alivisatos, A. P., Synthesis and Photovoltaic Application of Copper (I) Sulfide Nanocrystals. Nano Lett. 2008, 8, 2551-2555.

Xie, Z. Y.; Shao, S. Y.; Liu, F. M.; Wang, L. X., High-Efficiency Hybrid Polymer Solar Cells with Inorganic P- and N-Type Semiconductor Nanocrystals to Collect Photogenerated Charges. J. Phys. Chem. C 2010, 114, 9161-9166.

Yu, K.; Ouyang, J. Y.; Zhang, Y. G.; Tung, H. T.; Lin, S. Q.; Nagelkerke, R. A. L.; Kingston, D.; Wu, X. H.; Leek, D. M.; Wilkinson, D.; Li, C. S.; Chen, I. G.; Tao, Y., Low-Temperature Noninjection Approach to Homogeneously-Alloyed PbSexS1-x Colloidal Nanocrystals for Photovoltaic Applications. ACS Appl. Mater. Interfaces 2011, 3, 1511-1520.

Zhang, W. J.; Zhong, X. H., Facile Synthesis of ZnS-CulnS2-Alloyed Nanocrystals for a Color-Tunable Fluorchrome and Photocatalyst. Inorg. Chem. 2011, 50, 4065-4072.

Zhao, Y. X.; Pan, H. C.; Lou, Y. B.; Qiu, X. F.; Zhu, J. J.; Burda, C., Plasmonic Cu2-xS Nanocrystals: Optical and Structural Properties of Copper-Deficient Copper(I) Sulfides. J. Am. Chem. Soc. 2009, 131, 4253-4261.

Yang, Z. S.; Chang, H. T., CdHgTe and CdTe quantum dot solar cells displaying an energy conversion efficiency exceeding 2%. Sol. Energy Mater. Sol. Cells 2010, 94, 2046-2051.

Avellaneda, D.; Nair, M. T. S.; Nair, P. K., Cu2SnS3 and Cu4SnS4 Thin Films via Chemical Deposition for Photovoltaic Application. Journal of The Electrochemical Society 2010, D346-D352.

Allen, P.M. and Bawendi, M. G., Ternary I—III—VI Quantum Dots Luminescent in the Red to Near-Infrared, Department of Chemistry, Massachusetts Institute of Technology, published on Web, Jun. 27, 2008, 2 pages, J. Am. Chem. Soc. 2008, 130, 9240-9241.

Barton, P. B., Solid-Solutions in System Cu-Fe-S .1. Cu-S and CuFe-S Joins. Econ. Geol. 1973, 68, 455-465.

Beard, M. C.; Gao, J. B.; Luther, J. M.; Semonin, O. E.; Ellingson, R. J.; Nozik, A. J., Quantum Dot Size Dependent J-V Characteristics in Heterojunction ZnO/PbS Quantum Dot Solar Cells. Nano Lett. 2011, 11, 1002-1008.

Castro, S. L; Bailey, S. G.; Raffaelle, R. P.; Banger, K. K.; Hepp, A. F., Nanocrystalline Chalcopyrite Materials (CulnS2 and CulnSe2) via Low-Temperature Pyrolysis of Molecular Single-Source Precursors. Chem. Mater. 2003, 15, 3142-3147.

Cattley, C. A.; Stavrinadis, A.; Beal, R.; Moghal, J.; Cook, A. G.; Grant, P. S.; Smith, J. M.; Assender, H.; Watt, A. A. R., Colloidal synthesis of lead oxide nanocrystals for photovoltaics. Chem. Commun. 2010, 46, 2802-2804.

Chen, L. J.; Liao, J. D.; Chuang, Y. J.; Fu, Y. S., Synthesis and Characterization of Cu(InxB1-x)Se2 Nanocrystals for Low-Cost Thin Film Photovoltaics. J. Am. Chem. Soc. 2011, 133, 3704-3707.

Dayal, S.; Kopidakis, N.; Olson, D. C.; Ginley, D. S.; Rumbles, G., Photovoltaic Devices with a Low Band Gap Polymer and CdSe Nanostructures Exceeding 3% Efficiency. Nano Lett. 2010, 10, 239-242.

Debnath, R.; Tang, J.; Barkhouse, D. A.; Wang, X. H.; Pattantyus-Abraham, A. G.; Brzozowski, L.; Levina, L.; Sargent, E. H., Ambient-Processed Colloidal Quantum Dot Solar Cells via Individual Pre-Encapsulation of Nanoparticles. J. Am. Chem. Soc. 2010, 132, 5952-5953.

Ding, Y.; Veblen, D. R.; Prewitt, C. T., Possible Fe/Cu ordering schemes in the 2a superstructure of bornite (Cu5FeS4). Am. Mineral. 2005, 90, 1265-1269.

Ellingson, R. J.; Beard, M. C.; Johnson, J. C.; Yu, P. R.; Micic, O. I.; Nozik, A. J.; Shabaev, A.; Efros, A. L., Highly Efficient Multiple Exciton Generation in Colloidal PbSe and PbS Quantum Dots. Nano Lett. 2005, 5, 865-871.

Ennaoui, A.; Fiechter, S.; Pettenkofer, C.; Alonsovante, N.; Buker, K.; Bronold, M.; Hopfner, C.; Tributsch, H., Iron Disulfide for Solar-Energy Conversion. Sol. Energy Mater. Sol. Cells 1993, 29, 289-370.

Feng, J.; Sun, M.; Yang, F.; Yang, X. R., A facile approach to synthesize high-quality ZnxCuylnS1.5+x+0.5y nanocrystal emitters. Chem. Commun. 2011, 47, 6422-6424.

Geisz, J. F.; Friedman, D. J., III-N-V semiconductors for solar photovoltaic applications. Semicond. Sci. Technol. 2002, 17, 769-777.

Ginley, D. S.; Habas, S. E.; Platt, H. A. S.; Van Hest, M. F. A. M., Low-Cost Inorganic Solar Cells: From Ink to Printed Device. Chem. Rev. 2010, 110, 6571-6594.

Grguric, B. A.; Putnis, A.; Harrison, R. J., An investigation of the phase transitions in bornite (Cu5FeS4) using neutron diffraction and differential scanning calorimetry. Am. Mineral. 1998, 83, 1231-1239.

Guo, Q. J.; Hillhouse, H. W.; Agrawal, R., Synthesis of Cu2ZnSnS4 Nanocrystal Ink and Its Use for Solar Cells. J. Am. Chem. Soc. 2009, 131, 11672-11673.

Hanna, M. C.; Nozik, A. J., Solar conversion efficiency of photovoltaic and photoelectrolysis cells with carrier multiplication absorbers. J. Appl. Phys. 2006, 100, 074510.

Harichandran, G.; Lalla, N. P., Facile synthesis of CuAIS2 nanorods. Mater. Lett. 2008, 62, 1267-1269.

Hodes, G.; Itzhaik, Y.; Niitsoo, O.; Page, M., Sb2S3-Sensitized Nanoporous TiO2 Solar Cells. J. Phys. Chem. C 2009, 113, 4254-4256.

Hodes, G.; Moon, S. J.; Itzhaik, Y.; Yum, J. H.; Zakeeruddin, S. M.; Grätzel, M., Sb2S3-Based Mesoscopic Solar Cell using an Organic Hole Conductor. Journal of Physical Chemistry Letters 2010, 1, 1524-1527.

Hu, Y.; Zheng, Z.; Jia, H. M.; Tang, Y. W.; Zhang, L. Z., Selective Synthesis of FeS and FeS2 Nanosheet Films on Iron Substrates as Novel Photocathodes for Tandem Dye-Sensitized Solar Cells. J. Phys. Chem. C 2008, 112, 13037-13042.

Huynh, W. U.; Dittmer, J. J.; Alivisatos, A. P., Hybrid Nanorod-Polymer Solar Cells. Science 2002, 295, 2425-2427.

Kassim, A.; Weetee, T.; Abdullah, A.; Nagalingam, S.; Min, H. S., Deposition and Characterization of Cu4SnS4 Thin Films by Chemical Bath Deposition Method. Maced. J. Chem. Chem. Eng. 2010, 29, 97-103.

Kayes, B. M.; Atwater, H. A.; Lewis, N. S., Comparison of the device physics principles of planar and radial p-n junction nanorod solar cells. J. Appl. Phys. 2005, 97, 114302.

Klimov, V. L, Mechanisms for Photogeneration and Recombination of Multiexcitons in Semiconductor Nanocrystals: Implications for Lasing and Solar Energy Conversion. J. Phys. Chem. B 2006, 110, 16827-16845.

Konstantatos, G.; Levina, L.; Tang, J.; Sargent, E. H., Sensitive Solution-Processed Bi2S3 Nanocrystalline Photodetectors. Nano Lett. 2008, 8, 4002-4006.

Lee, H. J.; Yum, J. H.; Leventis, H. C.; Zakeeruddin, S. M.; Haque, S. A.; Chen, P.; Seok, S. I.; Grazel, M.; Nazeeruddin, M. K., CdSe Quantum Dot-Sensitized Solar Cells Exceeding Efficiency 1% at Full Sun Intensity. J. Phys. Chem. C 2008, 112, 11600-11608.

Lee, H.; Yoon, S. W.; Kim, E. J.; Park, J., In-situ Growth of Copper Sulfide Nanocrystals on Multiwalled Carbon Nanotubes and Their Application as Novel Solar Cell and Amperometric Glucose Sensor Materials. Nano Lett. 2007, 7, 778-784.

Leschkies, K. S.; Beatty, T. J.; Kang, M. S.; Norris, D. J.; Aydil, E. S., Solar Cells Based on Junctions between Colloidal PbSe Nanocrystals and Thin ZnO Films. ACS Nano 2009, 3, 3638-3648.

(56) References Cited

OTHER PUBLICATIONS

Lewis, N. S., Toward Cost-Effective Solar Energy Use. Science 2007, 315, 798-801.

Lewis, N. S.; Nocera, D. G., Powering the planet: Chemical challenges in solar energy utilization. Proc. Natl. Acad. Sci. U. S. A. 2006, 103, 15729-15735.

Lin, Y. Y.; Wang, D. Y.; Yen, H. C.; Chen, H. L.; Chen, C. C.; Chen, C. M.; Tang, C. Y.; Chen, C. W., Extended red light harvesting in a poly(3-hexylthiophene)/iron disulfide nanocrystal hybrid solar cell. Nanotechnology 2009, 20.

Liu, H. T.; Liu, Y.; Wang, Z.; HE, P., Facile synthesis of monodisperse, size-tunable SnS nanoparticles potentially for solar cell energy conversion. Nanotechnology 2010, 21.

Lotfipour, M., Machani, T.; Rossi, D.P.; Plass, K- E., α-Chalcocite Nanoparticle Synthesis and Stability. Chem. Mater. 2011, 23, 3032-3038.

Luther, J. M.; Law, M.; Beard, M. C.; Song, Q.; Reese, M. O.; Ellingson, R. J.; Nozik, A. J., Schottky Solar Cells Based on Colloidal Nanocrystal Films. Nano Lett. 2008, 8, 3488-3492.

Ma, W.; Luther, J. M.; Zheng, H. M.; Wu, Y.; Alivisatos, A. P., Photovoltaic Devices Employing Ternary PbSxSe1-x Nanocrystals. Nano Lett. 2009, 9, 1699-1703.

Machani, T.; Rossi, D. P.; Golden, B. G.; Jones, E. C.; Lotfipour, M.; Plass, K. E., Synthesis of Monoclinic and Tetragonal Chalcocite Nanoparticles by Iron-Induced Stabilization. Chem. Mater. 2011, 23, 5491-5495.

Maikov, G. I.; Vaxenburg, R.; Sashchiuk, A.; Lifshitz, E., Composition-Tunable Optical Properties of Colloidal IV-VI Quantum Dots, Composed of Core/Shell Heterostructures with Alloy Components. ACS Nano 2010, 4, 6547-6556.

Mora-Sero, I.; Gimenez, S.; Macor, L.; Guijarro, N.; Lana-Villarreal, T.; Gomez, R.; Diguna, L. J.;.Shen, Q.; Toyoda, T.; Bisquert, J., Improving the performance of colloidal quantum-dot-sensitized solar cells. Nanotechnology 2009, 20, 295204.

Nozik, A. J., Nanoscience and Nanostructures for Photovoltaics and Solar Fuels. Nano Lett. 2010, 10, 2735-2741.

Nozik, A. J.; Beard, M. C.; Luther, J. M.; Law, M.; Ellingson, R. J.; Johnson, J. C., Semiconductor Quantum Dots and Quantum Dot Arrays and Applications of Multiple Exciton Generation to Third-Generation Photovoltaic Solar Cells. Chem. Rev. 2010, 110, 6873-6890.

Page, M.; Niitsoo, O.; Itzhaik, Y.; Cahen, D.; Hodes, G., Copper sulfide as a light absorber in wet-chemical synthesized extremely thin absorber (ETA) solar cells. Energy & Environmental Science 2009, 2, 220-223.

Palomares, E.; Martinez-Ferrero, E.; Albero, J., Materials, Nanomorphology, and Interfacial Charge Transfer Reactions in Quantum Dot/Polymer Solar Cell Devices. Journal of Physical Chemistry Letters 2010, 1, 3039-3045.

Pan, D. C.; Wang, X. L.; Zhou, Z. H.; Chen, W.; Xu, C. L.; Lu, Y. F., Synthesis of Quaternary Semiconductor Nanocrystals with Tunable Band Gaps. Chem. Mater. 2009, 21, 2489-2493.

Pan, D. C.; Weng, A; Wang, X. L.; Xiao, Q. F.; Chen, W.; Xu, C. L.; Yang, Z. Z.; Lu, Y. F., Alloyed semiconductor nanocrystals with broad tunable band gaps. Chem. Commun. 2009, 4221-4223.

Panthani, M. G.; Akhavan, V.; Goodfellow, B.; Schmidtke, J. P.; Dunn, L.; Dodabalapur, A.; Barbara, P.F.; Korgel, B.A., Synthesis of CulnS2, CulnSe2, and Cu(InxGa1-x)Se2 (CIGS) Nanocrystal "Inks" for Printable Photovoltaics. J. Am. Chem. Soc. 2008, 130, 16770-16777.

Pattantyus-Abraham, A. G.; Kramer, I. J.; Barkhouse, A. R.; Wang, X. H.; Konstantatos, G.; Debnath, R.; Levina, L.; Raabe, I.; Nazeeruddin, M. K.; Grätzel, M.; Sargent, E. H., Depleted-Heterojunction Colloidal Quantum Dot Solar Cells. ACS Nano 2010, 4, 3374-3380.

Peter, L. M., Towards sustainable photovoltaics: the search for new materials. Philos. Trans. R. Soc. London, Ser. A 2011, 369, 1840-1856.

Plass, R.; Pelet, S.; Krueger, J.; Gratzel, M.; Bach, U., Quantum Dot Sensitization of Organicinorganic Hybrid Solar Cells. J. Phys. Chem. B 2002, 106, 7578-7580.

Guo, Q.; Ford, G. M.; Yang, W. C., Walker, B. C.; Stach, E. A.; Hillhouse, H. W., Agrawal, R., Fabrication of 7.2% Efficient CZTSSe Solar Cells Using CZTS Nanocrystals. J. Am. Chem. Soc. 2010, 132, 17384-17386.

Chopra, K. L.; Das, S. R., Thin Film Solar Cells. Plenum Press: New York, 1983.

Cox, P.A., The Elements: Their Origin, Abundance and Distribution, Oxford Science Publications, 1991.

* cited by examiner

DEVELOPMENT OF EARTH-ABUNDANT MIXED-METAL SULFIDE NANOPARTICLES FOR USE IN SOLAR ENERGY CONVERSION

CROSS-REFERENCE TO RELATED APPLICATIONS

This application claims the benefit of the filing date under 35 U.S.C. §119(a)-(d) of U.S. Provisional Patent Application No. 61/582,973, filed Jan. 4, 2012. The entire disclosure of the aforementioned application is incorporated herein by reference.

FIELD OF THE INVENTION

This invention pertains to the discovery and novel synthesis of mixed metal sulfide nanoparticles.

INDUSTRIAL APPLICABILITY

Solar energy is the one renewable energy resource sufficiently abundant to meet projected world needs (Lewis, 2006). One avenue towards the widespread placement of photovoltaic (PV) or photoelectrochemical cell (PEC) devices to exploit this resource is the development of inexpensive devices using readily available semiconducting materials (Lewis, 2007). Extensive research is going into developing nanoparticle solar light absorbers that combine the optimal band gap for a single junction photovoltaic with processability and controlled surface chemistry to enable charge transport (Nozik, 2010a; Nozik, 2010b; Ginley, 2010). Synthesis of nanoparticles consisting of readily available, abundant elements has recently been spurred on by the need for inexpensive solar light absorbers. Meanwhile, a desire for tunability of properties has provoked study of a series of solid solutions. The present invention includes aspects to synthesize earth-abundant solid-solution nanoparticles that combine property-tuning and constituent availability.

The attraction of micro- or nanoparticles as solar light absorbers lies in their potential to reduce the cost of production of PV devices. Device fabrication may be made less expensive by using small particles that can be incorporated into production processes as inks or baths (Ginley, 2010; Panthani, 2008). Furthermore, their small size may facilitate rapid charge carrier collection (Kayes, 2005), relaxing the need for high purity and the associated high cost. Nanocrystal-based photovoltaics have been intensively investigated, with many different device architectures and light-absorbing materials. Examples of the various means of employing nanoscale light absorbers include Schottky cells (highest efficiency 3.6%) (Ma, 2009; Luther, 2008; Leschkies, 2009; Debnath, 2010), depleted heterojunction cells (5.1%) (Panttantyus-Abraham, 2010), sensitization of metal oxides (5.2%) (Vogel, 1994; Plass, 2002; Lee, 2008; Mora-Sero, 2009; Hodes, 2009; Page, 2009; Beard, 2011; Hu, 2008; Hodes, 2010), and polymer heterojunction cells (3.13%) (Xie, 2010; Palomares, 2010; Huynh, 2002; Watt, 2005; Dayal, 2010). These architectures share the need for a single material that absorbs light, generates an electron-hole pair, and then allows for transport and separation of these charges. These functions define the desired characteristics of the nanomaterials used: optimal band gap, strong light absorption, phase-purity, and surface termination that passivates and allows charge movement. To most efficiently utilize the solar spectrum, light-absorbing semiconductors should have a band gap within an optimum range (1.1 eV to 1.5 eV) if a single light absorber is to be used (see FIG. 1) (Shockley, 1961; Hanna, 2006). Smaller band gap materials do not absorb enough solar radiation, while larger band gap materials lose too much energy to heat. Even greater energy conversion efficiencies may be obtained through generating multiple electron-hole pairs (multiple exciton generation) (Ellingson, 2005; Klimov, 2006) or by enabling the construction of low-cost multi junction cells (Nozik, 2010a; Geisz, 2002). Phase-purity and surface chemistry are both key to ensuring that generated charges are efficiently collected. Sub-band gap impurities in the bulk and at the surface form "traps" for photogenerated charge, which reduce the distance charges can travel before recombining Key to improving the efficiencies of nanoparticle photovoltaics is improving the transport of charge carriers across the particle interfaces by reducing trap-states and electrically insulating barriers.

Developing nanocrystalline light absorbers from abundant elements is one route toward increasing the cost-to-efficiency ratio of photovoltaics. Not only should nanocrystalline light absorbers exhibit optimal light absorbing and charge transport properties, they must also be non-toxic and inexpensive, and therefore must consist of highly abundant, readily available elements (Peter, 2011). This is necessitated both by cost and by the huge amount of surface area that would need to be covered by solar cells to meet even present electricity needs. To meet the United States electricity needs (3 TW per year) using 20% efficient cells, 1% of land area would be needed—about half of the land area covered by roads and parking lots. While this may seem daunting, many widely available semiconducting materials are capable of generating this vast amount of energy with low production costs, including Cu2S and FeS2 (Wadia, 2009). Most nanoparticle photovoltaics have used cadmium and lead chalcogenides (Ma, 2009; Luther, 2008; Leschkies, 2009; Panttantyus-Abraham, 2010; Plass, 2002; Lee, 2008; Beard, 2011; Huynh, 2002; Watt, 2005; Dayal, 2010; Cattley, 2010; Watt, 2005), with a more recent focus on Cu(Ga,In)Se2-type nanocrystals (Panthani, 2008; Pan, 2009a; Chem, 2011b). Cd, Ga, In, Se, and Te are all relatively scarce and expensive, and Pb and Cd are quite toxic (Cox, 1989). Nanoparticles of more abundant metal sulfides like SnS (Liu, 2010), FeS2 (Hu, 2008; Lin, 2009), Sb2S3 (Vogel, 1994; Hodes, 2009; Hodes, 2010; Salinas-Estevane, 2010), Bi2S3 (Vogel, 1994; Konstantatos, 2008; Sigman, 2005) Cu2ZnSnS4 (Guo, 2009; Riha, 2009; Guo, 2010; Steinhagen, 2009), and Cu2S (Page, 2009; Wu, 2008; Lee, 2007) have, therefore, been studied for use in solar cells. Among these, Cu2S and FeS2 are very economical based on their wide-spread availability and their optimal band-gaps (Eg=1.2 eV and 0.95 eV, respectively) (Wadia, 2009).

Extensive investigation of these materials as thin film light absorbers, however, has revealed their shortcomings. FeS2 films are often accompanied by FeS and Fe(1-x)S2 phases that cause sub-band gap light absorption, oxidize extremely rapid in air, and have a lower-than optimal band gap (Ennaoui, 1993). Cu2S films transform over time to djurleite (Cu1.97S), which can drop thin film cell efficiencies by 60% (Chopra, 1983), although djurleite may not be as detrimental to nanoparticle-based cells (Page, 2009). As noted above, particle-based cells may reduce the sensitivity to these effects by enabling rapid charge separation, but the nanoparticle morphology could also exacerbate phase instability, as we recently found with Cu2S nanoparticles (Lotfipour, 2011). Incorporation of additional earth-abundant cations into copper-sulfide and iron-sulfide matrices, as proposed in accordance with the present invention, can afford compounds with greater phase and chemical stability and/or improved optical properties while maintaining the constituent availability that makes Cu2S and FeS2 appealing.

The materials and processes of the present invention will not only impact the field of nanoparticle-based solar energy conversion, but also open avenues towards tuning nanoparticle properties for use in batteries, transistors, sensors, and as catalysts. The broader impacts of this invention are manifold. The materials investigated here could aid the development of inexpensive solar energy conversion devices that would help to offset the detrimental environmental and political effects of dependence on fossil fuels for energy.

BACKGROUND

The potential utility of nanoparticle solid solutions in photovoltaics has motivated several recent studies into the synthesis of these structures (Ma, 2009; Pan, 2009; Pan, 2009; Smith, 2011a; Regulacio, 2010; Maikov, 2010; Zhang, 2011; Yu, 2011; Taniguchi, 2011; Tang, 2011; Smith, 2011b). The tunability of solid solutions allows subtle variation of properties (band gap, band edge energy) to maximize device performance. This has prompted investigation of the synthesis of numerous members of the chalcopyrite and zinc blende:chalcopyrite systems (ZnS:Cu(In,Ga)(S,Se)2) (Pan, 2009a; Chen, 2011; Pan, 2009b; Zhang, 2011; Tank, 2011; Allen, 2008; Feng, 2011; Wang, 2010; Tang, 2008), (Cd,Hg)Te (Taniguchi, 2011; Yang, 2010), and Pb(S,Se,Te) (Ma, 2009; Maikov, 2010; Yu, 2011; Smith, 2011b). These studies have primarily focused on synthesis by nucleation from a solution containing a mixture of cations and/or anions, though post-synthetic treatments have also been effected (Smith, 2011a; Taniguchi, 2011; Sadtler, 2009). When particles are nucleated from a mixed-precursor solution, the kinetics of reaction often determine whether a binary or multinary compound is obtained (Chen, 2011; Tang, 2008). That is, to form Pb(S,Se), S and Se precursors must be employed that react at similar rates (Smith, 2011b). Precursor identity and solvent are particularly effective at altering reactivity. Chelating amine solvents slow reactivity of Cu+ and encourage incorporation of B into Cu(In,B)Se2 (Chen, 2011). Oleylamine has been reported to work as an "activating agent" that promotes incorporation of multiple cations (Pan, 2009; Chopra, 1983).

Bulk preparations of mixed-metal sulfides have been reported in the literature. Various forms of copper aluminum sulfide have been reported in the literature. For example, CuAlS2 (Harichandran, 2008), Cu5AlS4 (Morita, 1995), CuAlXSY. (Jeon, 2010; Jeon, 2011a; Jeon, 2011b) have been reported. Copper tin sulfides such as Cu4SnS4 are known (Girt, 2012a; Girt, 2012b; Munteanu, 2008a; Munteanu, 2008b). The copper iron sulfide, bornite, is also known (Ding, 2005; George, 2012; Grguric, 1998). However, none of these references report the preparation of mixed-metal sulfide as nanoparticles.

REFERENCES 1. (Allen, 2008) Allen, P. M.; Bawendi, M. G., Ternary I-III-VI quantum dots luminescent in the red to nearinfrared. *J. Am. Chem. Soc.* 2008, 130, 9240-9241.
2. (Barton, 1973) Barton, P. B., Solid-Solutions in System Cu—Fe—S.1.Cu—S and CuFe—S Joins. *Econ. Geol.* 1973, 68, 455-465.
3. (Beard, 2011) Beard, M. C.; Gao, J. B.; Luther, J. M.; Semonin, O. E.; Ellingson, R. J.; Nozik, A. J., Quantum Dot Size Dependent J-V Characteristics in Heterojunction ZnO/PbS Quantum Dot Solar Cells. *Nano Lett.* 2011, 11, 1002-1008.
4. (Castro, 2003) Castro, S. L.; Bailey, S. G.; Raffaelle, R. P.; Banger, K. K.; Hepp, A. F., Nanocrystalline chalcopyrite materials ($CuInS_2$ and $CuInSe_2$) via low-temperature pyrolysis of molecular single-source precursors. *Chem. Mater.* 2003, 15, 3142-3147.
5. (Cattley, 2010) Cattley, C. A.; Stavrinadis, A.; Beal, R.; Moghal, J.; Cook, A. G.; Grant, P. S.; Smith, J. M.; Assender, H.; Watt, A. A. R., Colloidal synthesis of lead oxide nanocrystals for photovoltaics. *Chem. Commun.* 2010, 46, 2802-2804.
6. (Cattley, 2010) Cattley, C. A.; Stavrinadis, A.; Beal, R.; Moghal, J.; Cook, A. G.; Grant, P. S.; Smith, J. M.; Assender, H.; Watt, A. A. R., Colloidal synthesis of lead oxide nanocrystals for photovoltaics. *Chem. Commun.* 2010, 46, 2802-2804.
7. (Chen, 2011) Chen, L. J.; Liao, J. D.; Chuang, Y. J.; Fu, Y. S., Synthesis and Characterization of $Cu(In_xB_{1-x})Se_2$ Nanocrystals for Low-Cost Thin Film Photovoltaics. *J. Am. Chem. Soc.* 2011, 133, 3704-3707.
8. (Chopra, 1983) Chopra, K. L.; Das, S. R., *Thin Film Solar Cells*. Plenum Press: New York, 1983.
9. (Dayal, 2010) Dayal, S.; Kopidakis, N.; Olson, D. C.; Ginley, D. S.; Rumbles, G., Photovoltaic Devices with a Low Band Gap Polymer and CdSe Nanostructures Exceeding 3% Efficiency. *Nano Lett.* 2010, 10, 239-242.
10. (Debnath, 2010) Debnath, R.; Tang, J.; Barkhouse, D. A.; Wang, X. H.; Pattantyus-Abraham, A. G.; Brzozowski, L.; Levina, L.; Sargent, E. H., Ambient-Processed Colloidal Quantum Dot Solar Cells via Individual Pre-Encapsulation of Nanoparticles. *J. Am. Chem. Soc.* 2010, 132, 5952-5953.
11. (Ding, 2005) Ding, Y.; Veblen, D. R.; Prewitt, C. T., Possible Fe/Cu ordering schemes in the 2a superstructure of bornite ($Cu_5FeS_4$). *Am. Mineral.* 2005, 90, 1265-1269.
12. (Ellingson, 2005) Ellingson, R. J.; Beard, M. C.; Johnson, J. C.; Yu, P. R.; Micic, O. I.; Nozik, A. J.; Shabaev, A.; Efros, A. L., Highly efficient multiple exciton generation in colloidal PbSe and PbS quantum dots. *Nano Lett.* 2005, 5, 865-871.
13. (Ennaoui, 1993) Ennaoui, A.; Fiechter, S.; Pettenkofer, C.; Alonsovante, N.; Buker, K.; Bronold, M.; Hopiher, C.; Tributsch, H., Iron Disulfide for Solar-Energy Conversion. *Sol. Energy Mater. Sol. Cells* 1993, 29, 289-370.
14. (Feng, 2011) Feng, J.; Sun, M.; Yang, F.; Yang, X. R., A facile approach to synthesize high-quality $Zn_xCu_yInS_{1.5+x+0.5y}$ nanocrystal emitters. *Chem. Commun.* 2011, 47, 6422-6424.
15. (Geisz, 2002) Geisz, J. F.; Friedman, D. J., III-N-V semiconductors for solar photovoltaic applications. *Semicond. Sci. Technol.* 2002, 17, 769-777.
16. (George, 2012) U.S. Appl. 20120036963 of George published Feb. 16, 2012.
17. (Ginley, 2010) Ginley, D. S.; Habas, S. E.; Platt, H. A. S.; van Hest, M. F. A. M., Low-Cost Inorganic Solar Cells: From Ink To Printed Device. *Chem. Rev.* 2010, 110, 6571-6594.
18. (Girt, 2012a) U.S. Pat. No. 8,158,880 issued Apr. 17, 2012 to Girt et al.
19. (Girt, 2012b) U.S. Appl. 2012/0192936 of Girt et al published Aug. 2, 2012.
20. (Grguric, 1998) Grguric, B. A.; Putnis, A.; Harrison, R. J., An investigation of the phase transitions in bornite ($Cu_5FeS_4$) using neutron diffraction and differential scanning calorimetry. *Am. Mineral.* 1998, 83, 1231-1239.

21. (Guo, 2009) Guo, Q. J.; Hillhouse, H. W.; Agrawal, R., Synthesis of $Cu_2ZnSnS_4$ Nanocrystal Ink and Its Use for Solar Cells. *J. Am. Chem. Soc.* 2009, 131, 11672-11673.
22. (Guo, 2010) Guo, Q.; Ford, G. M.; Yang, W. C.; Walker, B. C.; Stach, E. A.; Hillhouse, H. W.; Agrawal, R., Fabrication of 7.2% Efficient CZTSSe Solar Cells Using CZTS Nanocrystals. *J. Am. Chem. Soc.* 2010, 132, 17384-17386.
23. (Hanna, 2006) Hanna, M. C.; Nozik, A. J., Solar conversion efficiency of photovoltaic and photoelectrolysis cells with carrier multiplication absorbers. *J. Appl. Phys.* 2006, 100, 074510.
24. (Harichandran, 2008) Harichandran, G.; Lalla, N. P., Facile synthesis of $CuAlS_2$ nanorods. *Mater. Lett.* 2008, 62, 1267-1269.
25. (Hodes, 2009) Hodes, G.; Itzhaik, Y.; Niitsoo, O.; Page, M., Sb2S3-Sensitized Nanoporous TiO2 Solar Cells. *J. Phys. Chem. C* 2009, 113, 4254-4256.
26. (Hodes, 2010) Hodes, G.; Moon, S. J.; Itzhaik, Y.; Yum, J. H.; Zakeeruddin, S. M.; Grätzel, M., $Sb_2S_3$-Based Mesoscopic Solar Cell using an Organic Hole Conductor. *Journal of Physical Chemistry Letters* 2010, 1, 1524-1527.
27. (Hu, 2008) Hu, Y.; Zheng, Z.; Jia, H. M.; Tang, Y. W.; Zhang, L. Z., Selective synthesis of FeS and $FeS_2$ nanosheet films on iron substrates as novel photocathodes for tandem dye-sensitized solar cells. *J. Phys. Chem. C* 2008, 112, 13037-13042.
28. (Huynh, 2002) Huynh, W. U.; Dittmer, J. J.; Alivisatos, A. P., Hybrid nanorod-polymer solar cells. *Science* 2002, 295, 2425-2427.
29. (Jeon, 2010) U.S. Appl. 2010/0006849 of Jeon et al published Jan. 14, 2010.
30. (Jeon, 2011a) U.S. Pat. No. 8,022,410 issued Sep. 20, 2011 to Jeon et al.
31. (Jeon, 2011b) U.S. Appl. 2011/0294268 of Jeon et al published Dec. 1, 2011.
32. (Kassim, 2010) Kassim, A.; WeeTee, T.; Abdullah, A.; Nagalingam, S.; Min, H. S., Deposition and Characterization of $Cu_4SnS_4$ Thin Films by Chemical Bath Deposition Method. *Maced. J. Chem. Chem. Eng.* 2010, 29, 97-103.
33. (Kayes, 2005) Kayes, B. M.; Atwater, H. A.; Lewis, N. S., Comparison of the device physics principles of planar and radial p-n junction nanorod solar cells. *J. Appl. Phys.* 2005, 97, 114302.
34. (Klimov, 2006) Klimov, V. I., Mechanisms for photogeneration and recombination of multiexcitons in semiconductor nanocrystals: Implications for lasing and solar energy conversion. *J. Phys. Chem. B* 2006, 110, 16827-16845.
35. (Konstantatos, 2008) Konstantatos, G.; Levina, L.; Tang, J.; Sargent, E. H., Sensitive Solution-Processed $Bi_2S_3$ Nanocrystalline Photodetectors. *Nano Lett.* 2008, 8, 4002-4006.
36. (Lee, 2008) Lee, H. J.; Yum, J. H.; Leventis, H. C.; Zakeeruddin, S. M.; Hague, S. A.; Chen, P.; Seok, S. I.; Grazel, M.; Nazeeruddin, M. K., CdSe quantum dot-sensitized solar cells exceeding efficiency 1% at full sun intensity. *J. Phys. Chem. C* 2008, 112, 11600-11608.
37. (Lee, 2007) Lee, H.; Yoon, S. W.; Kim, E. J.; Park, J., In-situ growth of copper sulfide nanocrystals on multiwalled carbon nanotubes and their application as novel solar cell and amperometric glucose sensor materials. *Nano Lett.* 2007, 7, 778-784.
38. (Leschkies, 2009) Leschkies, K. S.; Beatty, T. J.; Kang, M. S.; Norris, D. J.; Aydil, E. S., Solar Cells Based on Junctions between Colloidal PbSe Nanocrystals and Thin ZnO Films. *ACS Nano* 2009, 3, 3638-3648.
39. (Lewis, 2007) Lewis, N. S., Toward cost-effective solar energy use. *Science* 2007, 315, 798-801.
40. (Lewis, 2006) Lewis, N. S.; Nocera, D. G., Powering the planet: Chemical challenges in solar energy utilization. *Proc. Natl. Acad. Sci. U.S.A.* 2006, 103, 15729-15735.
41. (Lin, 2009) Lin, Y. Y.; Wang, D. Y.; Yen, H. C.; Chen, H. L.; Chen, C. C.; Chen, C. M.; Tang, C. Y.; Chen, C. W., Extended red light harvesting in a poly(3-hexylthiophene)/iron disulfide nanocrystal hybrid solar cell. *Nanotechnology* 2009, 20.
42. (Liu, 2010) Liu, H. T.; Liu, Y.; Wang, Z.; He, P., Facile synthesis of monodisperse, size-tunable SnS nanoparticles potentially for solar cell energy conversion. *Nanotechnology* 2010, 21.
43. (Lotfipour, 2011) Lotfipour, M.; Machani, T.; Rossi, D. P.; Plass, K. E., $\alpha$-Chalcocite Nanoparticle Synthesis and Stability. *Chem. Mater.* 2011, 23, 3032-3038.
44. (Luther, 2008) Luther, J. M.; Law, M.; Beard, M. C.; Song, Q.; Reese, M. O.; Ellingson, R. J.; Nozik, A. J., Schottky Solar Cells Based on Colloidal Nanocrystal Films. *Nano Lett.* 2008, 8, 3488-3492.
45. (Ma, 2009) Ma, W.; Luther, J. M.; Zheng, H. M.; Wu, Y.; Alivisatos, A. P., Photovoltaic Devices Employing Ternary $PbS_xSe_{1-x}$Nanocrystals. *Nano Lett.* 2009, 9, 1699-1703.
46. (Machani, 2011) Machani, T.; Rossi, D. P.; Golden, B. G.; Jones, E. C.; Lotfipour, M.; Plass, K. E., Phase-controlled synthesis of monoclinic and tetragonal chalcocite nanoparticles. *Chem. Mater.* 2011, 23, 5491-5495.
47. (Maikov, 2010) Maikov, G. I.; Vaxenburg, R.; Sashchiuk, A.; Lifshitz, E., Composition-Tunable Optical Properties of Colloidal IV-VI Quantum Dots, Composed of Core/Shell Heterostructures with Alloy Components. *ACS Nano* 2010, 4, 6547-6556.
48. (Mora-Sero, 2009) Mora-Sero, I.; Gimenez, S.; Macor, L.; Guijarro, N.; Lana-Villarreal, T.; Gomez, R.; Diguna, L. J.; Shen, Q.; Toyoda, T.; Bisquert, J., Improving the performance of colloidal quantum-dot-sensitized solar cells. Nanotechnology 2009, 20, 295204.
49. (Morita, 1995) Morita, Y., Compound semiconductors and semiconductor light-emitting devices using the same. U.S. Pat. No. 5,427,716 Jun. 27, 1995.
50. (Munteanu, 2008a) U.S. Appl. 2008/0092945 of Munteanu et al published Apr. 24, 2008.
51. (Munteanu, 2008b) U.S. Appl. 2008/0092946 of Munteanu et al published Apr. 24, 2008.
52. (Nozik, 2010a) Nozik, A. J., Nanoscience and Nanostructures for Photovoltaics and Solar Fuels. *Nano Lett.* 2010, 10, 2735-2741.
53. (Nozik, 2010b) Nozik, A. J.; Beard, M. C.; Luther, J. M.; Law, M.; Ellingson, R. J.; Johnson, J. C., Semiconductor Quantum Dots and Quantum Dot Arrays and Applications of Multiple Exciton Generation to Third-Generation Photovoltaic Solar Cells. *Chem. Rev.* 2010, 110, 6873-6890.
54. (Page, 2009) Page, M.; Niitsoo, O.; Itzhaik, Y.; Cahen, D.; Hodes, G., Copper sulfide as a light absorber in wet-chemical synthesized extremely thin absorber (ETA) solar cells. *Energy & Environmental Science* 2009, 2, 220-223.
55. (Palomares, 2010) Palomares, E.; Martinez-Ferrero, E.; Albero, J., Materials, Nanomorphology, and Interfacial Charge Transfer Reactions in Quantum Dot/Polymer Solar Cell Devices. *Journal of Physical Chemistry Letters* 2010, 1, 3039-3045.

56. (Pan, 2009a) Pan, D. C.; Wang, X. L.; Zhou, Z. H.; Chen, W.; Xu, C. L.; Lu, Y. F., Synthesis of Quaternary Semiconductor Nanocrystals with Tunable Band Gaps. *Chem. Mater.* 2009, 21, 2489-2493.
57. (Pan, 2009b) Pan, D. C.; Weng, D.; Wang, X. L.; Xiao, Q. F.; Chen, W.; Xu, C. L.; Yang, Z. Z.; Lu, Y. F., Alloyed semiconductor nanocrystals with broad tunable band gaps. *Chem. Commun.* 2009, 4221-4223.
58. (Panthani, 2008) Panthani, M. G.; Akhavan, V.; Goodfellow, B.; Schmidtke, J. P.; Dunn, L.; Dodabalapur, A.; Barbara, P. F.; Korgel, B. A., Synthesis of $CuInS_2$, $CuInSe_2$, and $Cu(In_xGa_{1-x})Se_2$ (CIGS) Nanocrystal "Inks" for Printable Photovoltaics. *J. Am. Chem. Soc.* 2008, 130, 16770-16777.
59. (Panttantyus-Abraham, 2010) Pattantyus-Abraham, A. G.; Kramer, I. J.; Barkhouse, A. R.; Wang, X. H.; Konstantatos, G.; Debnath, R.; Levina, L.; Raabe, I.; Nazeeruddin, M. K.; Grätzel, M.; Sargent, E. H., Depleted-Heterojunction Colloidal Quantum Dot Solar Cells. *ACS Nano* 2010, 4, 3374-3380.
60. (Peter, 2011) Peter, L. M., Towards sustainable photovoltaics: the search for new materials. *Philos. Trans. R. Soc. London, Ser. A* 2011, 369, 1840-1856.
61. (Plass, 2002) Plass, R.; Pelet, S.; Krueger, J.; Grätzel, M.; Bach, U., Quantum dot sensitization of organicinorganic hybrid solar cells. *J. Phys. Chem. B* 2002, 106, 7578-7580.
62. (Regulacio, 2010) Regulacio, M. D.; Han, M. Y., Composition-Tunable Alloyed Semiconductor Nanocrystals. *Acc. Chem. Res.* 2010, 43, 621-630.
63. (Riha, 2009) Riha, S. C.; Parkinson, B. A.; Prieto, A. L., Solution-Based Synthesis and Characterization of $Cu_2ZnSnS_4$ Nanocrystals. *J. Am. Chem. Soc.* 2009, 131, 12054-12055.
64. (Sadtler, 2009) Sadtler, B.; Demchenko, D. O.; Zheng, H.; Hughes, S. M.; Merkle, M. G.; Dahmen, U.; Wang, L. W.; Alivisatos, A. P., Selective Facet Reactivity during Cation Exchange in Cadmium Sulfide Nanorods. *J. Am. Chem. Soc.* 2009, 131, 5285-5293.
65. (Salinas-Estevane) Salinas-Estevane, P.; Sanchez, E. M., Preparation of $Sb_2S_3$ nanostructures by the [BMIM] [BF4] ionic liquid assisted low power sonochemical method. *Mater. Lett.* 2010, 64, 2627-2630.
66. (Schockley, 1961) Shockley, W.; Queisser, H. J., Detailed Balance Limit of Efficiency of p-n Junction Solar Cells. *J. Appl. Phys.* 1961, 32, 510-519.
67. (Sigman, 2005) Sigman, M. B.; Korgel, B. A., Solventless synthesis of $Bi_2S_3$ (bismuthinite) nanorods, nanowires, and nanofabric. *Chem. Mater.* 2005, 17, 1655-1660.
68. (Smith, 2011a) Smith, A. M.; Nie, S. M., Bright and Compact Alloyed Quantum Dots with Broadly Tunable Near-Infrared Absorption and Fluorescence Spectra through Mercury Cation Exchange. *J. Am. Chem. Soc.* 2011, 133, 24-26.
69. (Smith, 2011b) Smith, D. K.; Luther, J. M.; Semonin, O. E.; Nozik, A. J.; Beard, M. C., Tuning the Synthesis of Ternary Lead Chalcogenide Quantum Dots by Balancing Precursor Reactivity. *ACS Nano* 2011, 5, 183-190.
70. (Steinhagen, 2009) Steinhagen, C.; Panthani, M. G.; Akhavan, V.; Goodfellow, B.; Koo, B.; Korgel, B. A., Synthesis of $Cu_2ZnSnS_4$ Nanocrystals for Use in Low-Cost Photovoltaics. *J. Am. Chem. Soc.* 2009, 131, 12554-12555.
71. (Swihart, 2007) Swihart, M. T.; Yong, K. T.; Sahoo, Y.; Prasad, P. N., Shape control of CdS nanocrystals in onepot synthesis. *J. Phys. Chem. C* 2007, 111, 2447-2458.
72. (Tang, 2008) Tang, J.; Hinds, S.; Kelley, S. O.; Sargent, E. H., Synthesis of Colloidal $CuGaSe_2$, $CuInSe_2$, and $Cu(InGa)Se_{}_2$ Nanoparticles. *Chem. Mater.* 2008, 20, 6906-6910.
73. (Tang, 2011) Tang, X. S.; Cheng, W. L.; Choo, E. S. G.; Xue, J. M., Synthesis of $CuInS_2$—ZnS alloyed nanocubes with high luminescence. *Chem. Commun.* 2011, 47, 5217-5219.
74. (Taniguchi, 2011) Taniguchi, S.; Green, M.; Lim, T., The Room-Temperature Synthesis of Anisotropic CdHgTe Quantum Dot Alloys: A "Molecular Welding" Effect. *J. Am. Chem. Soc.* 2011, 133, 3328-3331.
75. (Tatem 2008) Tate, J.; Newhouse, P. F.; Kykyneshi, R.; Hersh, P. A.; Kinney, J.; McIntyre, D. H.; Keszler, D. A., Chalcogen-based transparent conductors. *Thin Solid Films* 2008, 516, 5795-5799.
76. (Vogel, 1994) Vogel, R.; Hoyer, P.; Weller, H., Quantum-Sized PbS, CdS, Ag2S, Sb2S3, and Bi2S3 Particles as Sensitizers for Various Nanoporous Wide-Bandgap Semiconductors. *J. Phys. Chem.* 1994, 98, 3183-3188.
77. (Wadia, 2009) Wadia, C.; Alivisatos, A. P.; Kammen, D. M., Materials Availability Expands the Opportunity for Large-Scale Photovoltaics Deployment. *Environ. Sci. Technol.* 2009, 43, 2072-2077.
78. (Wang, 2010) Wang, X. L.; Pan, D. C.; Weng, D.; Low, C. Y.; Rice, L.; Han, J. Y.; Lu, Y. F., A General Synthesis of Cu—In—S Based Multicomponent Solid-Solution Nanocrystals with Tunable Band Gap, Size, and Structure. *J. Phys. Chem. C* 2010, 114, 17293-17297.
79. (Watt, 2005) Watt, A. A. R.; Blake, D.; Warner, J. H.; Thomsen, E. A.; Tavenner, E. L.; Rubinsztein-Dunlop, H.; Meredith, P., Lead sulfide nanocrystal: conducting polymer solar cells. *J. Phys. D: Appl. Phys.* 2005, 38, 2006-2012.
80. (Wiltrout, 2011) Wiltrout, A. M.; Machani, T.; Rossi, D. P.; Plass, K. E., Phase-Selective Synthesis of Bornite Nanoparticles. *J. Mater. Chem.*, 2011, 21, 19286-19292.
81. (Wooten, 2009) Wooten, A. J.; Werder, D. J.; Williams, D. J.; Casson, J. L.; Hollingsworth, J. A., Solution-Liquid-Solid Growth of Ternary Cu—In—Se Semiconductor Nanowires from Multiple- and Single-Source Precursors. *J. Am. Chem. Soc.* 2009, 131, 16177-16188.
82. (Wu, 2009) Wu, Y.; Wadia, C.; Ma, W. L.; Sadtler, B.; Alivisatos, A. P., Synthesis and photovoltaic application of copper(I) sulfide nanocrystals. *Nano Lett.* 2008, 8, 2551-2555.
83. (Xie, 2010) Xie, Z. Y.; Shao, S. Y.; Liu, F. M.; Wang, L. X., High-Efficiency Hybrid Polymer Solar Cells with Inorganic P- and N-Type Semiconductor Nanocrystals to Collect Photogenerated Charges. *J. Phys. Chem. C* 2010, 114, 9161-9166.
84. (Yang, 2010) Yang, Z. S.; Chang, H. T., CdHgTe and CdTe quantum dot solar cells displaying an energy conversion efficiency exceeding 2%. *Sol. Energy Mater. Sol. Cells* 2010, 94, 2046-2051.
85. (Yu, 2011) Yu, K.; Ouyang, J. Y.; Zhang, Y. G.; Tung, H. T.; Lin, S. Q.; Nagelkerke, R. A. L.; Kingston, D.; Wu, X. H.; Leek, D. M.; Wilkinson, D.; Li, C. S.; Chen, I. G.; Tao, Y., Low-Temperature Noninjection Approach to Homogeneously-Alloyed $PbSe_xS_{1-x}$ Colloidal Nanocrystals for Photovoltaic Applications. *ACS Appl. Mater. Interfaces* 2011, 3, 1511-1520.

86. (Zhang, 2011) Zhang, W. J.; Zhong, X. H., Facile Synthesis of ZnS—CuInS2-Alloyed Nanocrystals for a Color-Tunable Fluorchrome and Photocatalyst. *Inorg. Chem.* 2011, 50, 4065-4072.

87. (Zhao, 2009) Zhao, Y. X.; Pan, H. C.; Lou, Y. B.; Qiu, X. F.; Zhu, J. J.; Burda, C., Plasmonic $Cu_{2-x}S$ Nanocrystals: Optical and Structural Properties of Copper-Deficient Copper(I) Sulfides. *J. Am. Chem. Soc.* 2009, 131, 4253-4261.

SUMMARY

The present invention involves the synthesis of inexpensive nanocrystals of earth-abundant metal sulfide solid solutions for use as light absorbers in photovoltaics. These nanocrystals and nanoparticles may alternatively be employed as other photovoltaic components or as photocatalysts in solar water splitting or fuel-producing devices.

An embodiment of the invention is preparation of nanoparticle solid solutions comprising a Group 28, 29, or 30 soft metal sulfide, at least one hard metal ions such as period 4 transition metal ion, or groups 13 and 14 metal ions, and sulfur. Preferred soft metal ions include Cu+, Ag+, Ni2+, Pb2+, Zn2+, Cd2+, and Hg2+. More preferred are soft metal ions such as Cu+, Ag+, and Cd2+. A most preferred soft metal ion is Cu+.

Another embodiment of the invention is preparation of solid solutions consisting of nanoparticles of highly abundant elements, for example ZnS:CuFeS2, CuFeS2:CuAlS2, Cu5FeS4:Cu5AlS4, and Cu2SnS3:Cu2SiS3 which may have band gaps that can be tuned from the near-infrared to the ultraviolet region, enabling construction of low-cost nanoparticle-based multijunction photovoltaics. The solid solutions are prepared from specific precursors that induce cations with different sizes and affinities to react to form sulfides at the same rates.

The methods outlined below will enable the creation of nanoparticle compositions that include cations with disparate reactivities. The methods of the present invention provide instruction relevant to controlling crystallization—a process underlying all solid-state chemistry that is often unpredictable. The kinetic and thermodynamic behavior of main group and transition metal cation complexes in solution and at surfaces is another key field that is also addressed.

Many researchers have investigated how to use nanoparticles as solar energy absorbers to lower the cost-to-efficiency ratio for photovoltaics. There is a growing recognition that these light absorbers must consist of highly abundant elements, but this often comes at the cost of optimal properties. The invention shows that favorable optical properties may be obtained by designing earth-abundant nanoparticles in which optical and electrical properties are tuned by incorporation of multiple cations into a sulfur matrix.

A further embodiment of the invention is the synthesis, characterization, and implementation of mixed-metal sulfide nanoparticles as inexpensive, earth-abundant light-absorbers in solar energy conversion devices. This new battery of nanomaterials prepared by the processes of the present invention has potential to improve the cost-to efficiency ratio of photovoltaics.

In order to use nanoparticles as solar light absorbers, one must be able to tune the band gaps of these nanoparticles to the optimal value for solar energy conversion in single or multi junction photovoltaics. The inventor has developed novel syntheses of phase-pure α- and γ-Cu2S, Cu5FeS4, and Cu4SnS4 nanocrystals that have band gaps near 1.2 eV (Loftipour, 2011; Wiltrout, 2011; Machani, 2011). Further expansion development of the process has enabled the synthesis of nanoparticle solid solutions with wide ranges of band gap tunability. This methodology allows the incorporation of "hard" ions into "soft" copper sulfide matrices, such as ZnS:CuFeS2, CuFeS2:CuAlS2, Cu4FeS4:Cu4AlS4, and Cu2SnS3:Cu2SiS3. Smaller band gap adjustments can be effected with Zn-doping of FeS2. Phase, morphology, and composition of these new nanocrystals can be determined using standard techniques and are useful for determining the optical and electronic properties important for them to function as light-absorbers.

Generally, reactant mixtures containing multiple cations and sulfur unpredictably result in one of several possible outcomes. However, the processes of the present invention provide a rational synthetic scheme for preparing new mixed-metal chalcogenide nanoparticles. Further, the processes allow for the controlled crystallization of the new mixed-metal chalcogenide nanoparticles. The present invention allows for the incorporation of small, charge-dense metal species into copper-sulfide matrices by controlling reaction rates. A toolbox of simple ligands can be used to adjust reaction kinetics. Alternatively, multi-cation precursors can be designed to release metals simultaneously upon decomposition. These processes allow for the selective formation of binary or ternary stoichiometric phases, control the composition of nonstoichiometric solid solutions, and induce the nucleation of various polymorphic phases.

An embodiment of the invention is a process for the phase-controlled synthesis of ternary and quaternary mixed-metal sulfide nanoparticles comprising the steps of mixing, in a high-boiling organic solvent and under an inert atmosphere, a molar equivalent of a soft metal ion complex, 0.1 to 20 molar equivalents of a hard metal ion complex, and 0.1 to 10 molar equivalents of sulfur. A complexing ligand selected from the group consisting of bidentate, tridentate, and tetradentate ligands is added and the mixture is stirred and heated at about 80° C. to 300° C. under an inert atmosphere for 0.1 to 12 hours. Ternary and quaternary mixed-metal sulfide nanoparticles are obtained wherein the soft metal ion is incorporated in the mixed-metal sulfide nanoparticles. Typical incorporated soft metal ions include Cu+, Ag+, Ni2+, Pb2+, Zn2+, Cd2+, and Hg2+. Typical hard metal ions include Sc3+, Ti3+, Ti4+, V3+, V5+, Cr3+, Cr2+, Mn2+, Mn3+, Fe3+, Co3+, Al3+, Ga3+, In3+, Si4+, Ge4+, Sn4+, and Pb4+.

It is a preferred embodiment that the process be conducted using the complexing ligands for the soft metal ions selected from the group consisting of

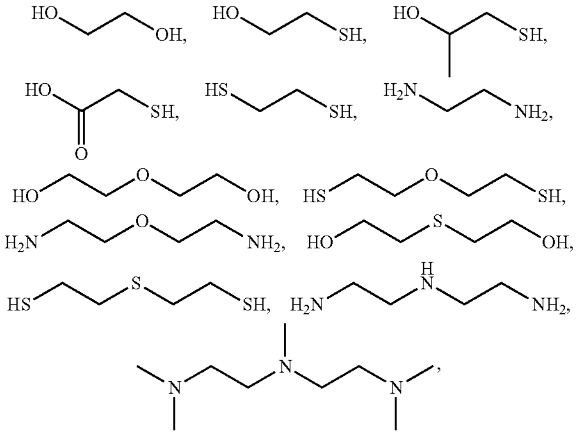

-continued

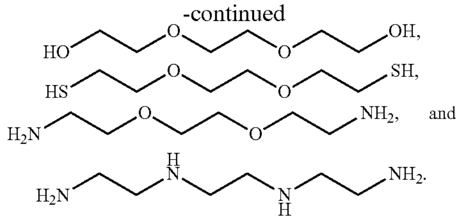

It is a preferred embodiment that the process be conducted using hard metal ion is selected from the group consisting of Cr3+, Mn2+, Fe3+, Fe2+, Co2+, Al3+, Tl3+, Si4+, Ge4+, and Sn4+.

It more preferred that the process of the invention be conducted using Cu+ as the soft metal ion and hard metal ion selected from the group consisting of, Fe3+, Al3+, Sn4+, and Si4+.

It is more preferred that the complexing ligand of the reaction is 2,2'-thiodiethanethiol.

A preferred embodiment of the invention is a process for the phase-controlled synthesis of ternary and quaternary mixed-metal copper sulfide nanoparticles comprising the steps of mixing, in a high-boiling organic solvent and under an inert atmosphere, equimolar amounts of a copper (II) complex, a metal complex of a hard metal ion, and 2 molar equivalents of sulfur. A complexing ligand selected from the group consisting of bidentate, tridentate, and tetradentate ligands is added and the mixture is then stirred and heated at about 80° C. to 300° C. under an inert atmosphere. Typically the hard metal ion is selected from the group consisting of Cr3+, Mn2+, Fe3+, Fe2+, Co2+, Al3+, Tl3+, Si4+, Ge4+, and Sn4+ and the high-boiling solvent is selected from the group consisting of trioctylphosphine oxide, oleylamine, 1-dodecanethiol, oleic acid, diphenyl ether, and mixtures thereof. A more preferred complexing ligand for the process is 2,2'-thiodiethanethiol and most preferred hard metal ions for the process are Fe3+, Al3+, Si4+, and Sn4+.

Another embodiment of the invention are the mixed-metal copper sulfide nanoparticles prepared by a process comprising the steps of mixing in a high-boiling organic solvent and under an inert atmosphere equimolar amounts of a copper complex and a complex of at least one hard-metal ion, heating the mixture to about 80° C. to 300° C., and injecting a solution of an equivalent of sulfur and heating the mixture about 280° C. for at least one hour. Preferred hard-metal ions for the process are Fe3+, Al3+, Si4+, and Sn4. The preferred solvents for the reaction are trioctylphosphine oxide, oleylamine, or dodecanethiol.

A more preferred embodiment is the mixed-metal copper sulfide nanoparticles obtained from the reaction of the soft metal copper complex, copper(II) acetylacetonate and the hard-metal complex, tin acetylacetonate dichloride.

It is a more preferred embodiment of the invention to obtain Cu4SnS4 when the organic solvent for the process is trioctylphosphine.

It is an embodiment of the invention to prepare bornite nanoparticles by a phase-controlled process comprising the steps of mixing under an inert atmosphere one molar equivalent of copper (II) acetylacetonate, 0.2 molar equivalents of iron (III) acetylacetonate, and 1.0 to 3.0 molar equivalents of sulfur in a dodecanethiol/oleic acid solvent mixture, and heating the mixture in the range of about 130 to 260° C. for about one hour. The process selectively forms the high polymorph form of bornite nanoparticles when the mixture is heated at about 130° C. during process. The process selectively forms the low polymorph form of bornite nanoparticles when the mixture is heated at about 260° C. during process step.

It is an embodiment of the invention to obtain bornite nanoparticles having the low polymorph form, when the reaction mixture comprises 1.6 to 3.0 molar equivalents of sulfur (excess sulfur), and the mixture is heated at about 180° C. In contrast, bornite nanoparticles having the high polymorph form, are obtained when wherein mixture comprises 1 molar equivalent of sulfur and the mixture is heated at about 180° C.

An embodiment of the invention is the process for the phase-controlled synthesis of stabilized chalcocite (Cu2S) nanoparticles comprising the steps of mixing under an inert atmosphere 2 molar equivalents of a copper (II) acetylacetonate, 1 molar equivalent of sulfur, and 0.01 to 0.10 molar equivalents of iron (III) acetylacetonate in oleylamine, and heating the mixture at about 200 to 260° C. for at least one hour.

An embodiment of the invention is a variation of the above process, wherein 2 molar equivalents of a copper (II) acetylacetonate, 1 molar equivalent of sulfur, and 0.05 to 0.10 molar equivalents of iron (III) acetylacetonate are mixed and heated in oleylamine to produce stabilized tetragonal chalcocite (γ-Cu2S) nanoparticles.

An embodiment of the invention is a variation of the above process, wherein 2 molar equivalents of a copper (II) acetylacetonate, 1 molar equivalent of sulfur, and 0.01 molar equivalents of iron (III) acetylacetonate are mixed and heated in oleylamine to produce stabilized monoclinic chalcocite (α-Cu2S) nanoparticles.

An embodiment of the invention is a process for the phase-controlled synthesis of stabilized tetragonal chalcocite (γ-Cu2S) nanoparticles comprising the steps of mixing under an inert atmosphere 2 molar equivalents of a copper (II) acetylacetonate, 1 molar equivalent of sulfur, and 0.01 to 0.10 molar equivalents of aluminum (III) acetylacetonate in 1-dodecanethiol/oleic acid solvent mixture, and heating the mixture at about 200 to 260° C. for at least one hour to produce stabilized tetragonal chalcocite (γ-Cu2S) nanoparticles.

An embodiment of the invention is a kit of reagents for facilitating the production of ternary and quaternary mixed-metal copper sulfide nanoparticles, said nanoparticles comprising copper ion, sulfur, and at least one hard metal ion selected from the group consisting of Sc3+, Ti3+, Ti4+, V3+, V5+, Cr3+, Cr2+, Mn2+, Mn3+, Fe3+, Co3+, Al3+, Ga3+, In3+, Si4+, Ge4+, Sn4+, and Pb4+, said kit comprising: a container of reagent comprising an activating ligand for enhancing the reactivity of the hard metal ion, wherein said activating ligand is selected from the group consisting of I−, Br−, 1,2-ethanedithiol, 2,2'-thiodiethanethiol, t-butyl alcohol, thioacetic acid, thioacetamide, and HSR wherein R is alkyl; a container of reagent comprising a complexing ligand for moderating the activity of the copper ion, wherein said complexing ligand is selected from the group consisting of

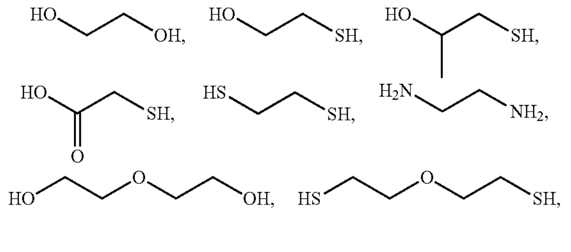

-continued

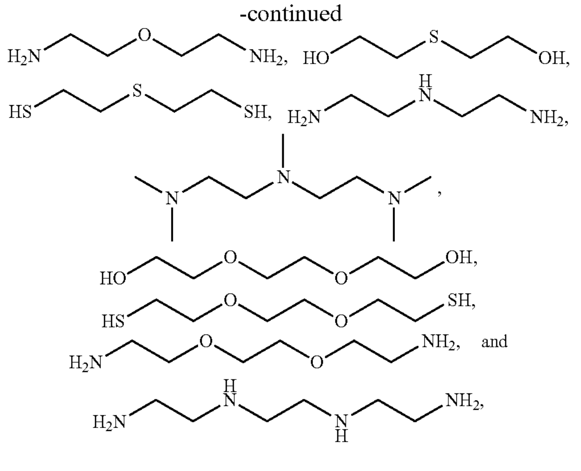

and a container of a high-boiling organic solvent selected from the group consisting of trioctylphosphine oxide, oleylamine, 1-dodecanethiol, oleic acid, diphenyl ether, and mixtures thereof.

A preferred embodiment of the invention is a kit wherein the activating ligand for the hard metal ion is 2,2'-thiodiethanethiol.

A preferred embodiment of the invention is a kit wherein the complexing ligand for the soft metal ion is 2.2'-thiodiethanethiol.

BRIEF DESCRIPTION OF THE DRAWINGS

FIG. 4 shows the predicted (solid black lines) and observed PXRD (outlined trace) patterns of the nanoparticles obtain in various solvents upon combination of copper and tin complexes in the presence of sulfur.

DETAILED DESCRIPTION OF THE EMBODIMENTS

Figure 1:
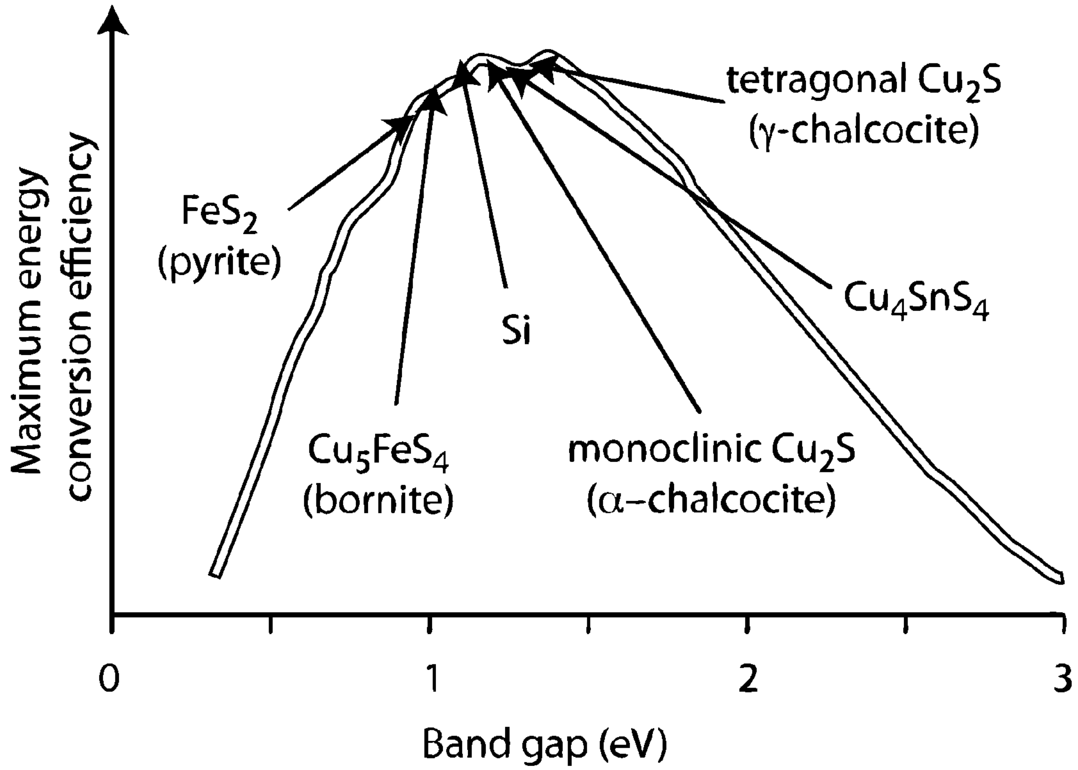
FIG. 1 shows the maximum energy conversion efficiency from sunlight with a single junction photovoltaic plotted versus the band gap of the light absorber. The reported band gaps of several exemplary copper sulfide materials are indicated in the figure.
Figure 2A:
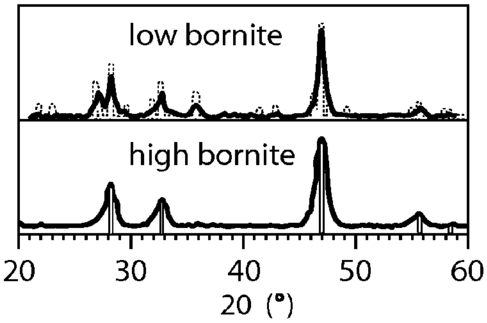
FIG. 2A) shows the powder X-ray diffraction for the high (black) and low (white) polymorphs of Cu2FeS4 nanoparticles.
Figure 2C:
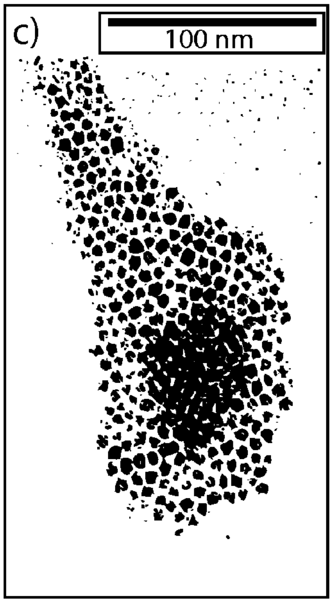
FIG. 2C) shows the size and morphology of Cu2FeS4 nanoparticles as determined by transmission electron microscopy.
Figure 2B:
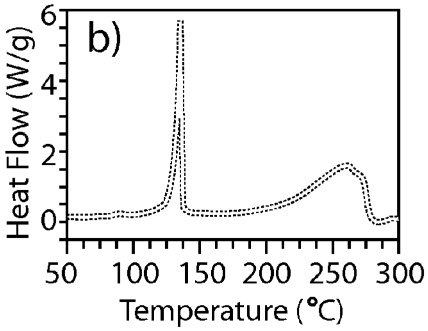
FIG. 2B) shows the characterization of Cu2FeS4 nanoparticles by differential scanning calorimetry.
Figure 2D:
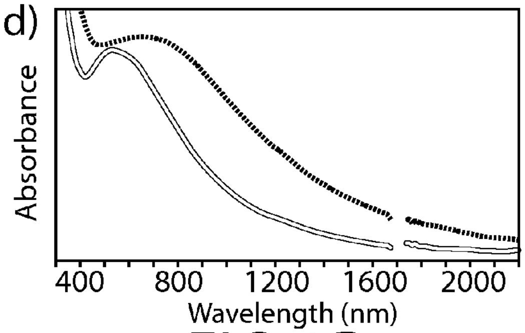
FIG. 2D) shows the UV/visible/NIR absorption spectrum of Cu2FeS4 nanoparticles.
Figure 2E:
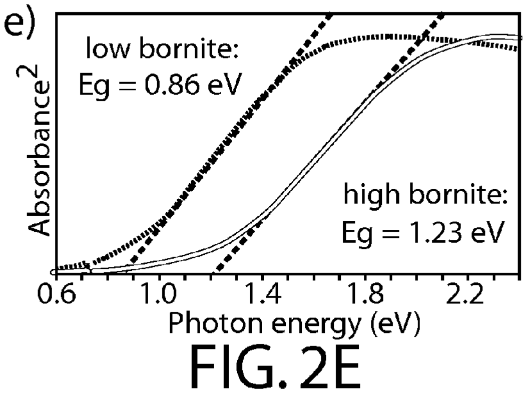
FIG. 2E) shows derived plots indicating the direct band gap of the high and low polymorphs of Cu2FeS4 nanoparticles.

One embodiment of the invention is a method for preparing ternary and quaternary mixed-metal sulfide nanoparticles via a rational synthesis using a toolkit of reagents. Nanoparticles produced by the method will typically have a particle dimension of less than 100 nm. The ternary and quaternary mixed-metal sulfide nanoparticles will be comprised of a soft metal ion, at least one hard metal ion and sufficient sulfur ions to balance the charge of the nanoparticle. The compounds will generally comprise 1 molar equivalent of the soft metal ion, 0.1 to 20 molar equivalents of the hard metal ion, and 0.1 to 10 molar equivalents of sulfur. Preferred soft metal ions include Cu+, Ag+, Ni2+, Pb2+, Zn2+, Cd2+, and Hg2+. More preferred soft metal ions include Cu+, Ag+, and Cd2+. Most preferred soft metal ion is Cu+. Hard metal ions include first row (period 4) high valence transition metal ions as well as groups 13 and 14 metals. Examples of hard metal ions are Sc3+, Ti3+, Ti4+, V3+, V5+, Cr3+, Cr2+, Mn2+, Mn3+, Fe3+, Co3+, Al3+, Ga3+, In3+, Si4+, Ge4+, Sn4+, and Pb4+. More preferred hard metal ions include Cr3+, Mn2+, Fe3+, Fe2+, Co2+, Al3+, Tl3+, Si4+, Ge4+, and Sn4+. Most preferred hard metal ions are Fe3+, Al3+, Si4+, and Sn4+.

The soft and hard metal ions are introduced to the reaction of metal complexes. For example acetylacetonate metal complexes. Other typical metal complexing agents include but are not limited to chloride, bromide, and acetate.

The mixed metal sulfide nanoparticles are typically prepared in a high boiling organic-based solvent which may have long alkyl chains or large organic groups such as cycloalkyl or aryl moieties. The solvent may also comprise a heteroatom such as N, S, O, or P, or the solvent may contain a heteroatom-containing functionality such as phosphine, amino, thiol, hydroxyl, ether, carboxylic acid, or similar group. Examples of suitable solvents include trioctylphosphine oxide (TOPO), oleylamine, 1-dodecanethiol, oleic acid, diphenyl ether, and mixtures thereof. Reactions are conducted between 80° C. and 300° C. for about 0.1 to 12 hours depending on the reactants. Generally shorter reaction times are preferred to generate the desired nanoparticles. The reactions are conducted under an inert atmosphere such nitrogen or argon to reduce the possibility of oxidation of the reactants during the process.

The present invention allows for the incorporation of small, charge-dense metal species into soft metal-sulfide matrices by controlling reaction rates. A toolbox of simple ligands can be used to adjust reaction kinetics. Ligands used to control the reaction rates include diols, dithiol, diamines, and related compounds (see Tables 1 and 2, below). The ligands may be activating ligands to speed the reaction of the hard metal ions or they may be complexing ligands to slow the reaction of soft metal ions. By use of these ligands allows one to rationally control the synthesis of desired mixed-metal sulfide nanoparticles.

We have exemplified the synthesized and characterized nanoparticles of several different phases of novel mixed-metal copper sulfide nanoparticles (Cu5FeS4 and Cu4SnS4) and several phases of copper sulfides (Cu1.80, Cu1.97, α-Cu2S, and γ-Cu2S). The set of data for the high and low polymorphs of Cu5FeS4 shown in FIG. 2 illustrates the basic characterization carried out. Solid-state phase of these particles was determined by powder X-ray diffraction (PXRD, FIG. 2A) and differential scanning calorimetry (DSC, FIG. 2B). These methods distinguished the two polymorphs and revealed the bornite solid-state structure. Transmission electron microscopy (TEM, FIG. 2C) showed spherical particles with diameters of 5.0±0.9 nm. UV/visible/near IR spectroscopy (UV/vis/NIR, FIGS. 2*d* and 2*e*) shows onset absorbances in the NIR, with nanoparticles of the polymorph low bornite absorbing light at substantially longer wavelengths. Examination of the shape of the spectra reveals the nature of the lowest band gap transition. Plots of (A)2 versus the photon energy (FIG. 2E) confirm the presence of a direct band gap for both high (1.22±0.02 eV) and low (0.86±0.03 eV) bornite species. Energy-dispersive X-ray spectroscopy (EDS) was used to discern compositions of Cu5.0±0.3Fe0.76±0.0654.4±0.5.

Figure 3:
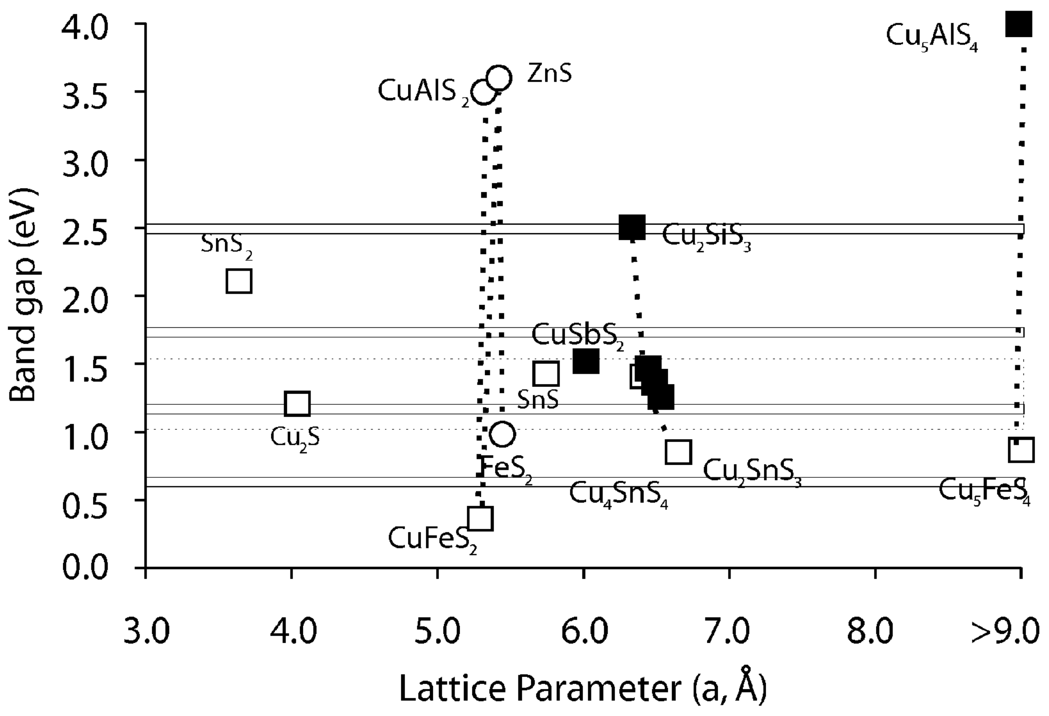
FIG. 3 shows plots of band gaps versus the smallest lattice parameter for typical earth-abundant sulfide compounds. Black boxes and their corresponding connecting lines indicate stoichiometric compounds and solid solutions, respectively, that can be produced by the methods of the present invention. White boxes indicate specific examples prepared by the inventors. The white circles indicate nanoparticles that have been synthesized by others. The optimal band gap region for a single junction photovoltaic is between 1.1 and 1.5 eV (the area between the dotted lines on the graph). The appropriate band gaps for a four-junction photovoltaic are in the four outlined areas at approximately 0.6, 1.2, 1.7, and 2.5 eV.

Having exemplified phase-controlled synthesis of a variety of copper-containing sulfide nanoparticles (FIG. 3), the process is applicable to synthesizing additional novel solid solutions and stoichiometric compounds. Tunability of the band gap over the entire visible-NIR region can be achieved by using synthesis of solid solutions of UV and NIR absorbing end-members to tune the band gap and edges toward those optimal for charge injection or for use in a multijunction cell. Nanoparticles of the ZnS:CuFeS2 solid solution are idea substances to be synthesized due to their very wide range of potential band-gap tunability (from 3.54 eV for cubic ZnS to 0.35 eV for tetragonal CuFeS2, FIG. 3). We demonstrated that end-member syntheses is possible under identical solvent, temperature, and time conditions. Nanocrystalline solid solutions of ZnS and the chalcopyrite materials CuGaS2 and CuInS2 are known (Pan, 2009b; Zhang, 2011; Feng, 2011; Tang, 2008). However, we have discovered that the unit cell parameters of CuFeS2 are an even better match to those of zinc blende ZnS than to CuInS2. (FIG. 3). Note that although we have made ZnS and CuFeS2 under similar conditions, a simple mixture of the Zn(acac)2, Cu(acac)2, and Fe(acac)3 complexes does not result in this solid solution. We must alter precursor reactivity to ensure that different cations are incorporated into the growing crystals at similar rates. The method is applicable to other earth-abundant solid solution, for example Cu2SiS3:Cu2SnS3, and allows tunability of band gap from the UV to the NIR. This challenging synthesis involves first synthesizing Cu2SiS3 nanoparticles. Forcing the hard "Si4+" species into a crystal with the very soft Cu+ and S2− ions requires careful reaction design. This synthetic process would be first to make SiS2, then Cu2SiS3, and finally Cu2(Si,Sn)S3. Uncovering the ability to rationally design copper-sulfide-containing ternary or quaternary nanoparticles that contain hard ions opens several other possible routes toward band gap tunability over a large wavelength range, including solid solutions of CuAlS2:CuFeS2 and Cu5AlS4:Cu5FeS4 (which will first require synthesis of nanocrystals of the little-studied CuAlS2 (Harichandran, 2008) and Cu5AlS4 (Morita, 1995).

Solid solutions can be distinguished from simple mixtures by the systematic variation in band gaps and unit cell parameters. PXRD is used to measure unit cell parameters, which are expected to vary linearly with composition in agreement with Vegard's law. Furthermore, we expect the band gap will be related to the composition through experimentally determined bowing equations. Thus relationship can be confirmed by measuring the band gaps of nanoparticles with varying composition by UV/vis/NIR spectroscopy and determining the relationship with the ratio of cations (measured using EDS or ICP-AES, as appropriate to the different detection limits).

Characterization of the stability of mixed metal sulfide nanoparticles can be determined by using X-ray photoelectron spectroscopy (XPS) and PXRD. PXRD patterns of mixed metal sulfide nanoparticles monitored over time after storage in ambient and oxygen- and water-free environments can reveal loss of crystallinity, transformation to a different phase, or formation of a crystalline oxide phase. FT-IR spectroscopy can also be used to monitor formation of sulfates and sulfites that accompany oxidation. XPS is a surface-sensitive technique that will be used to reveal different oxidation states and bonding environments at the nanoparticle surfaces. Due to the small escape depth of the generated photoelectrons, this technique samples less than 10 nm of the surface and thus can detect small changes in the surface chemistry, particularly due to oxidation.

The presence of multiple metal species during nanoparticle synthesis can affect the resultant nanoparticle phase in several ways, as illustrated by the following studies. Combination of Sn(Cl2)(acac)2 with Cu(acac)2 and S can produce Cu25, SnS, or Cu4SnS4 nanoparticles depending on the solvent. The presence of Fe(acac)3 with Cu(acac)2 and S can generate either of two polymorphs of Cu5FeS4 or it can alter nucleation of copper sulfide species in such a way as to stabilize metastable phases.

Cu4SnS4 nanoparticles were synthesized by combination of 1 mmol Cu(acac)2 and 1 mmol Sn(acac)2Cl2 in 10 mL trioctylphosphine oxide (TOPO) at 280° C., followed by injection of 1 mmol S in 3 mL of oleylamine and heating for 1 hour. Cu4SnS4 thin films have been reported to have a direct band gap of 1 eV, 1.2 eV, or 1.57 eV (Kassim, 2010; Avellandeda, 1998), while we observed particles with a direct band gap of 1.55 eV and indirect absorption beginning around 1.2 eV; thus this material may be able to serve as an efficient light absorber in photovoltaics.

Figure 4A:
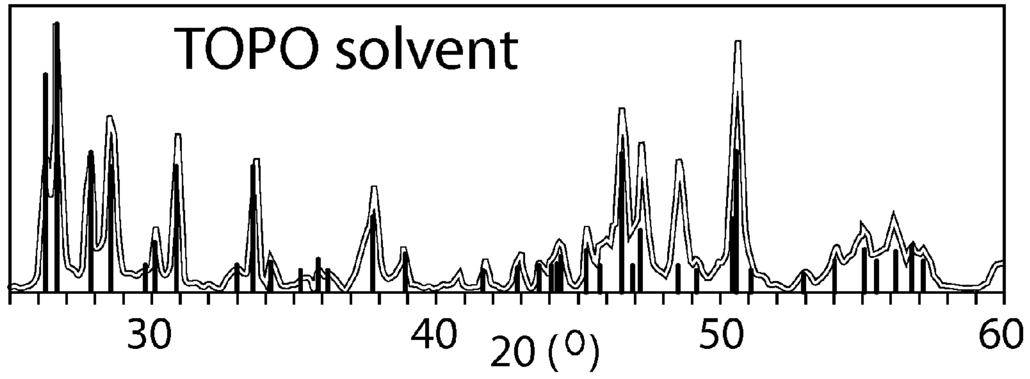
FIG. 4A) shows a pattern that is consistent with the formation of Cu4SnS4 nanoparticles when the reaction is done in trioctylphosphine oxide as the solvent.
Figure 4B:
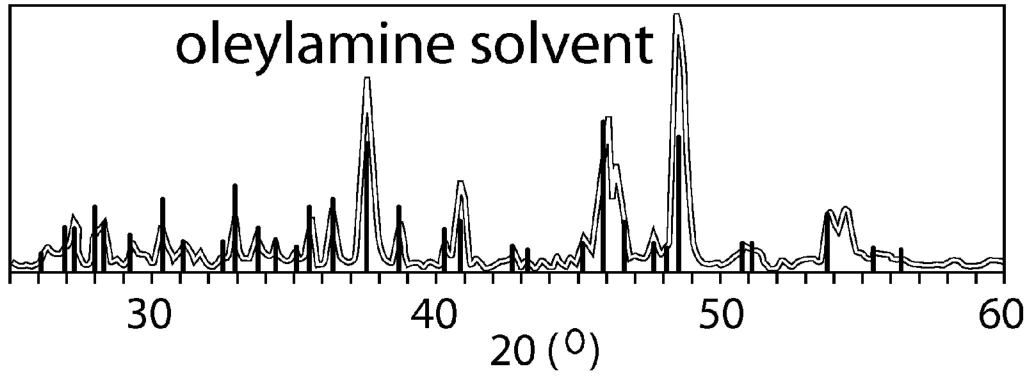
FIG. 4B) shows a pattern that is consistent with the formation of Cu2S nanoparticles when the reaction is done in oleylamine as the solvent.
Figure 4C:
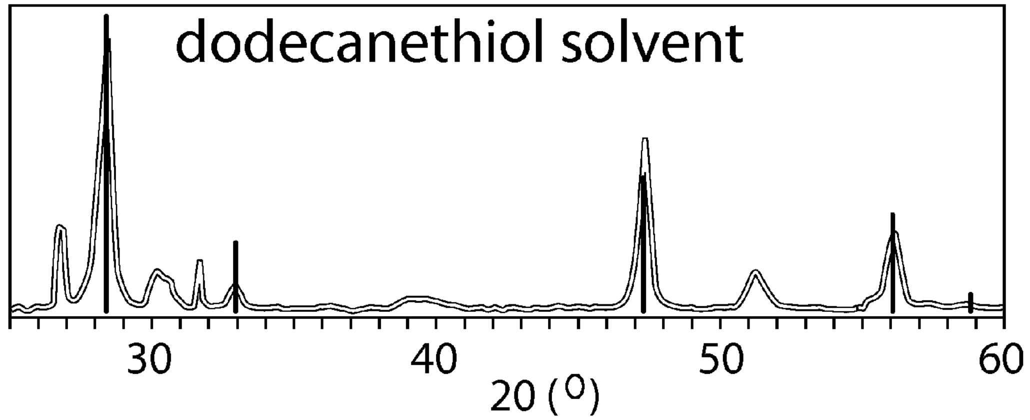
FIG. 4C) shows a pattern that is consistent with the formation of impure SnS particles when the reaction is done in dodecanethiol as the solvent.

Solvent is the key factor in obtaining nanoparticles of the mixed metal sulfide Cu4SnS4 as opposed to binary copper or tin sulfides (FIG. 4). Metal solutions in TOPO encourage incorporation of tin into the copper sulfide matrix whereas oleylamine-metal solutions result in the formation of Cu2S species. This phase-selectivity may be due to the different rates of precursor degradation or differences in the thermodynamic stability of these phases. The rates of Cu and Sn precursor degradation could be more similar in TOPO, and therefore the necessary solutes to form Cu4SnS4 are present concurrently in TOPO but in oleylamine, Cu+ species are available first, so copper sulfide is formed immediately. An alternative theory could be based on thermodynamics; perhaps the solute conditions are favorable for formation of either Cu4SnS4 or Cu2S, but that a greater solubility on the part of Cu4SnS4 results in dissolution of this species and formation of a more stable Cu2S.

To determine why Cu4SnS4 nanoparticles result from TOPO but Cu2S particles result from oleylamine, a series of experiments were carried out. First, thermodynamic control over phase-selectivity was ruled out by heating Cu4SnS4 particles formed in TOPO to 260° C. in oleylamine. If Cu4SnS4 particles were too soluble to form in oleylamine, we would expect precipitation of copper sulfide particles. Instead, much larger Cu4SnS4 particles precipitated, showing that Cu4SnS4 nanoparticles were soluble enough to continue growth through Ostwald ripening processes, but not too soluble to exist under these conditions. This suggests that the rate of precursor decomposition is indeed the controlling factor here. It follows, therefore, that the same precursor ratios employed with a solvent that better coordinates Cu+ than Sn4+ should produce tin sulfide nanoparticles. Indeed, when 1-dodecanthiol is selected as a solvent, cubic SnS particles are observed. The kinetics of precursor decomposition determines whether binary ($Cu_2S$ or Sn) or ternary ($Cu_4SnS_4$) sulfide particles are obtained.

Nanoparticles of high and low bornite ($Cu_5FeS_4$) polymorphs were obtained selectively by either of two different methods: (1) by variation in the reaction temperature and (2) by variation of the amount of sulfur in the reaction mixture. We have demonstrated the phase selective synthesis and identified the origins of this behavior.

High reaction temperatures (260° C.) induced formation of low bornite, while low reaction temperatures (130° C.) produced the more disordered high bornite, regardless of the sulfur concentration (50 mM or 80 mM). This is the reverse of what would be expected based on the relative stabilities of these polymorphs—low bornite is stable at room temperature, while high bornite is stable above 250° C. (Grguric, 1998). For comparison, the less stable wurtzite form of CdSe is generated at high temperatures, as opposed to the zinc blende form (Swihart, 2007). That a higher temperature is required to produce the more thermodynamically favored low bornite form indicates that it has a greater activation energy than high bornite. At lower temperature, the thermodynamically favorable low bornite is kinetically unachievable—instead the more quickly formed high bornite is obtained. The greater activation energy of low bornite could be attributed to the unfavorable entropy change upon creation of the very ordered low bornite structure in which copper ions, iron ions, and vacancies are placed at specific positions within a superstructure (Ding, 2005). At intermediate (180° C.) temperatures, the phase obtained is dependent on S concentration (low bornite nanoparticles are obtained with Cu:S ratios of 1:3 to 1:1.6, while high bornite is obtained with 1:1 ratios). Formation of both phases is likely in competition at intermediate temperature, with formation of the more disordered high bornite phase occurring more rapidly. As the concentration of sulfur increases, the creation of the slower-forming low bornite becomes more competitive. This interpretation is supported by the observation that low bornite is formed when the reaction is allowed to run for 6 hours, regardless of the sulfur concentration.

Bornite not only exists as several different solid-state forms, but it is a member of the complex Cu—Fe—S ternary phase system, and is thus in competition with numerous other metal sulfide species. Lower Cu:Fe ratios (0.5:1 molar ratio) produced the most Fe-rich phase, chalcopyrite ($CuFeS_2$). Having established conditions under which this very low band gap (0.35 eV) material forms, we have a basis for investigation of the solid solutions formed between $CuFeS_2$ and ZnS as well as $CuAlS_2$ and $CuFeS_2$. The ability to alter stoichiometry by simply changing the solution metal complex ratios suggests that unlike the Cu—Sn—S system, $Cu^+$ and $Fe^{3+}$ are incorporated at similar rates in 1-dodecanethiol/oleic acid mixtures. Greater amounts of $Cu^+$ induced formation of digenite ($Cu_{1.80}S$) nanoparticles.

Generally, α-$Cu_2S$ nanoparticles are difficult to obtain because of the rapidity with which they transform to the more stable, copper-deficient, djurleite. By addition of varying amounts of iron during the synthesis, we can slow or eliminate this detrimental transition to either selectively stabilize α-$Cu_2S$ or induce formation of a metastable high-temperature phase, γ-$Cu_2S$. Addition of Fe to a 2:1 molar ratio of Cu(II)(acac)2:S in oleylamine allows phase-selective synthesis of monoclinic chalcocite, tetragonal chalcocite, and roxbyite, depending upon the amount of Fe added. A typical synthesis involved Cu(II)(acac)2 (2.0 mmol), Fe(III)(acac)3 (between 0.10 and 0.01 mmol), and elemental S (1.0 mmol) heated in oleylamine to 260° C.

Addition of small amounts of iron to the copper and sulfur-containing reaction mixture allows phase-selective synthesis of monoclinic (a) chalcocite. Note that without addition of iron, the same synthetic conditions may form monoclinic chalcocite nanoparticles, but often significant amounts of djurleite are also observed, and the monoclinic chalcocite nanoparticles obtained under these conditions transform to djurleite within days. Monoclinic chalcocite nanoparticle synthesis is more difficult than in bulk and thin film morphologies. In large surface area nanoparticles, transformation of monoclinic chalcocite to copper-deficient djurleite is accelerated by the ready diffusion of copper ions from the bulk. Incorporation of a small concentration of Fe ions, too low to be detectable via EDS, likely blocks the pathways by which copper ions would diffuse from the monoclinic chalcocite crystal. While monoclinic chalcocite nanoparticles synthesized without iron under these conditions completely transformed to djurleite after a few days under ambient conditions, particles obtained using iron resisted complete transformation to djurleite for at least 35 days, as determined by PXRD.

While monoclinic chalcocite nanoparticle formation was induced at low Fe concentrations, tetragonal (γ) chalcocite forms at higher concentrations. This unusual chalcocite form has similar optical properties as monoclinic chalcocite, but does not transform to djurleite due to a distinct unit cell shape. As the amount of Fe added increased, the ratio of tetragonal to monoclinic chalcocite obtained continually increased until, at 5.0 mol %, the PXRD pattern showed only peaks due to tetragonal chalcocite. Further experiments carried out to try to understand the role of iron in formation of tetragonal chalcocite have revealed that, thus far, iron seems to be unique in its affect on the phase of copper sulfides. Fe(III)(acac)3 and Fe(II)(acac)2 both induced tetragonal chalcocite formation at the same concentrations. Given the highly reducing oleylamine environment and high temperatures, it is likely that Fe(III) species are transformed to Fe(II), and that Fe(II) is the species that interacts with and alters chalcocite crystallization. The 3+ transition metal species Cr(III)(acac)3, Mn(III)(acac)3, and Co(III)(acac)3 and the 2+ species Mn(II)(acac)2 and Co(II)(acac)2 were separately introduced into the reaction mixture ratios at 0.1:2.0 metal:Cu molar ratios. None of these five species induced tetragonal chalcocite formation, instead resulting in djurleite or roxbyite formation. Seeding of tetragonal $Cu_2S$ crystals by tetragonal FeS nuclei, which have very similar unit cell parameters, is one possible explanation.

Under the reaction conditions of the method of this invention, addition of multiple metal species to a sulfur-containing solution could result in several outcomes: formation of a stoichiometric mixed-metal sulfide, formation of a solid solution, formation of a mixture of species, or a binary metal sulfide distinct from that formed in the absence of other metal species. Understanding and controlling these outcomes is critical for development of rational mixed metal sulfide nanoparticle synthesis. The supporting data shows clearly that even metastable nanoparticle phases can be obtained under the correct reaction conditions, though the search for these conditions is highly empirical. We seek to gain a more detailed understanding of individual reactions by identification of the mechanisms of phase-selectivity and by devising rational strategies for obtaining mixed metal sulfide nanoparticles.

The phase-selectivity of nanoparticle crystallization from mixed-metal solutions were studied through systematic investigation of representative cases of formation of stoichiometric mixed-metal sulfides and alteration of the binary polymorphic phase. The Cu—Sn—S system is an excellent example of a system where formation of binary or ternary species is highly dependent on reaction conditions. We expanded our studies of formation of Cu4SnS4 in different solvent combinations (varying the metal-complex solvents and the S solvent), which we have already seen has a dramatic effect on phase. For example, injection of S from oleylamine into a metal solution of TOPO generates Cu4SnS4, but injection from better complexing solvents like ethylene diamine could encourage growth of Cu2SnS3 due to slowing of the rate of incorporation of Cu+. Investigations of the effect of different temperatures and concentrations will uncover changes in the relative rates of decomposition of Sn and Cu precursors that could be employed to encourage ternary metal sulfide growth in other systems. To further understand why the presence of multiple cations in solution can alter the polymorph of the binary phase, we studied two systems which we have discovered exhibit this behavior: the α-/γ-Cu2S system and the orthorhombic/cubic SnS system. As discussed above, γ-Cu2S nanoparticles are generated in the presence of Fe(acac)3 or Fe(acac)2 in an oleylamine solution under conditions that generate α-Cu2S or djurleite in the absence of the iron complex. Furthermore, we have also found that γ-Cu2S forms when Al(acac)3 is added to Cu(acac)2 and S in a 1-dodecanethiol/oleic acid solvent mixture that would otherwise produce α-Cu25 or djurleite. Initial studies on SnS nanoparticles suggest that orthorhomic polymorph is obtained from Sn(acac)2Cl2/S solution in 1-dodecanethiol while the cubic SnS polymorph occurs upon addition of a molar equivalent of Cu(acac)2. Among the possible explanations for the formation of alternative polymorphs upon addition of multiple cations to the reaction solutions are heteronucleation by binary metal clusters and alteration of the relative stabilities of these polymorphs by face-selective binding of ions or complexes. Determination of the effect of mixed cation solutions on particle growth rates and morphologies will help distinguish between these possibilities, as will determination of the time, temperature, concentration, and solvent-dependence of this behavior.

From the preliminary studies above, it is clear that the presence of multiple metal complexes in a solution with a sulfur source could produce several different synthetic outcomes. These studies have helped create a better understanding of the relationship between reactant conditions and the phase of the resulting metal sulfide nanoparticles. The inventors have used this understanding to rationally design quaternary and ternary sulfide nanoparticles. This knowledge was applied to the design of cation precursors to control the relative rates of cation availability, either by differentially varying the strength of interaction between the cations and ligands/solvent or by creation of multication-containing precursors that would encourage simultaneous cation incorporation.

One route towards rational synthesis of ternary and quaternary sulfides is to select precursors that form nanoparticles at similar rates in the same temperature and solvent conditions. Synthesis of a battery of precursors for a given metal and measurement of their relative reactivities in various solvents has enabled the inventors to generate a "tool kit" or system from which to select precursors of different metals with matched reactivities to obtain mixed metal sulfide nanoparticles. This assumes that similarity in precursor reaction rates induces incorporation of multiple cations, which is valid for several systems. Cu+ precursors were altered by chelation and complexation to different heteroatoms to obtain species that more closely match the rates of sulfide formation with "hard" metal species like "Al3+", "Sn4+", or "Si4+". A large number of simple bi-, tri-, and tetradentate ligands are commercially available and may allow fine-tuning of the reactivity of the Cu+ ion. Increase in the number of binding sites may have the largest influence of the Cu+ reaction rate, while alteration of the heteroatom from 0 to S to N may have a subtle, but useful, effect. We have found that an equimolar solution of Cu(acac)2, Sn(acac)2Cl2, and S in oleylamine results in Cu2S, but the same reaction conditions in ethylene diamine or triethylene tetraamine produce SnS. The ability to make small adjustments to reactivity rates allows for greater synthetic control. Similarly, unstable hard cation complexes that would increase the driving force for mixed cation sulfide formation can be synthesized and employed. First, these complexes can be tested for their ability to form binary sulfide species, and the rates of reactivity among "Si4+" precursors can be compared. Then, a copper silicon sulfide phase can be produced using the rate-matched Cu+ and "Si4+" precursors. The next step is to control the phase and stoichiometry of the obtained ternary sulfide by alteration of reactant ratios.

Examples of ions of interest, activating ligands, and complexing ligands appear in the table below. Activating ligands would speed the reaction of the hard metal ions. In contrast the complexing ligands would slow the reaction rate of Cu+ ions.

Table 1 provides a list of representative activating ligands for hard metal ion to speed the reaction rate of these ions in the processes of the present invention to prepare ternary and quaternary mixed-metal sulfide nanoparticles. These activating ligands may be soft or sterically hindered. Use of activating ligands with hard metal ions in conjunction with complexing ligands for soft metal ions enables the rational synthesis of mixed-metal sulfide nanoparticles.

TABLE 1

| Representatives Activating Ligands for Hard Metal Ions<br>Ligand |
|---|
| $I^-$ |
| $Br^-$ |
| HSR, R = akly group |
| 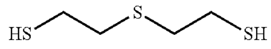 |
| 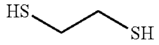 |
| 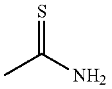 |
| 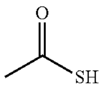 |

Table 2 provides a list of representative complexing ligands for soft metal ion to slow the reaction rate of these ions in the processes of the present invention to prepare ternary and quaternary mixed-metal sulfide nanoparticles. These complexing ligands may be bidentate, tridentate, or tetradentate. Use of complexing ligands for soft metal ions in conjunction with activating ligands for hard metal ions enables the rational synthesis of mixed-metal sulfide nanoparticles.

TABLE 2

Representative Complexing Ligands for Soft Metal Ions

| Bidentate | Tridentate | Tetradentate |
| --- | --- | --- |

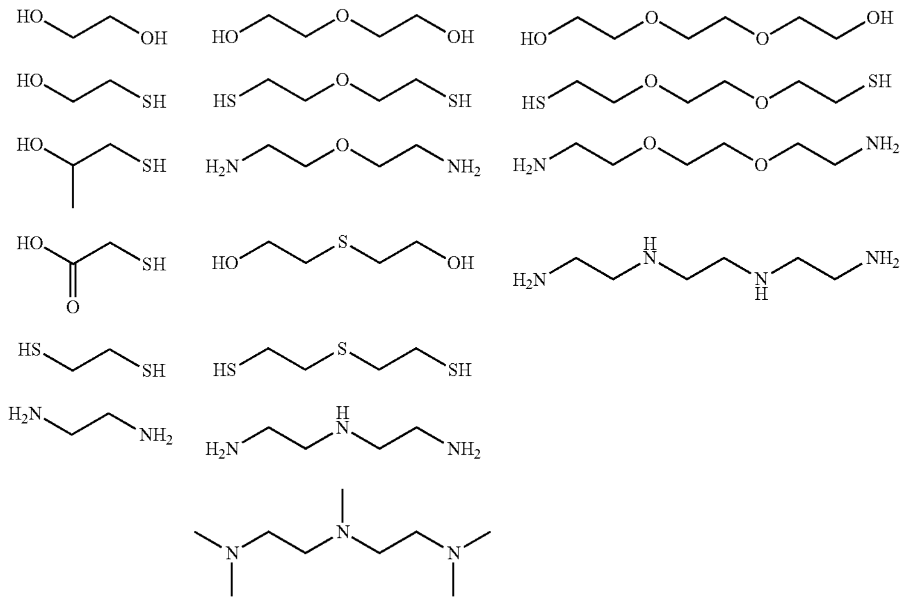

A related route toward the synthesis of mixed metal sulfides from multi-metal precursors that contain all the different metals to be incorporated in the desired ratios, which could then be expected to decompose releasing the necessary metal species at the same time. Such a single-source precursor technique has been employed in the formation of CuInSe2 and CuFeS2 among others (Wooten, 2009; Castro, 2003; Zhao, 2009). For the present invention, complexes can be designed to include both "Si4+" and Cu+. The process would require ligands with multiple functional groups that cannot chelate metals. Benzene groups with multiple functionalities could serve as this rigid substrate. For example, 4-mercapto-benzenoic acid, for example, is expected to coordinate both a soft Cu+ ion at the thiol and a hard Sn4+ species at the acid site. The remainder of the coordination spheres for both species would be made up of monodentate ligands that could prevent coordination polymer formation. This route relies upon use of a minimally coordinating solvent to ensure that the single-source precursor does not degrade into two separate solvent-coordinated species. Thus, octadecene, diphenyl ether, or dioctyl phthalate could be used as high-boiling points solvents for these reactions.

The outcomes of the research detailed here have implications for many other fields. The specific aims of this research are focused on development of earth-abundant nanoparticle solar light absorbers, but the fundamental understanding of how to produce nanoparticles that incorporate several elements opens the possibilities of unlimited material-tunability for other applications as well. Many devices critical for alternative energy production and storage are presently limited by materials capabilities or availability, such as solar water-splitting devices and batteries. Indeed, without the development of a means of storing the electricity produced by solar energy, photovoltaics are not a feasible large-scale energy source. The creation of new materials with controllable absorption, transport, catalytic, or stability properties is needed in all of these areas. Furthermore, the synthetic paradigms developed here to generate copper-sulfide-containing ternary and quaternary nanoparticles can be used to make Li-ion battery cathodes and the transparent conductive components of light absorbing or emitting devices.

EXAMPLES

Example 1

Synthesis of Copper Tin Sulfide Nanoparticles

In the standard synthesis of $Cu_4SnS_4$, the reaction was run in a 50 mL two or three neck round bottom flask under a constant flow of nitrogen. Solid trioctylphosphine oxide (90%) from Sigma Aldrich was melted and 10 mL was pipetted into the reaction vessel. To the vessel, 1 mmol of tin(IV) bis(acetylacetonate) dichloride (95%) from Alfa Aesar and 1 mmol of copper(II) acetylacetonate (≥99.99%) from Sigma Aldrich were added to the vessel. The flask was purged with nitrogen gas for 15 minutes. The solution was than heated to 280° C. under constant nitrogen flow while stirring. 1 mmol of elemental sulfur was sonicated in 3 mL of oleylamine for 25 minutes then injected into the metal solution when it reached 280° C. The reaction was continued for 1 hour and 15 minutes, then was cooled to room temperature. The reaction was transferred to a 50 mL centrifuge tube. Enough hexane was added to the tube to suspend the particles (5 mL). To this, 30 mL acetone was added until particles began to precipitate. The solutions were than centrifuged for 10 min at 6000 rpm. The supernatant was discarded, the particles re-suspended in 5 mL hexane, 30 mL acetone was added, and the solution was centrifuged for 10 minutes at 6000 rpm. This process was repeated once more, and the centrifuge tubes were sealed and stored until the particles were needed for characterization.

Example 2

Synthesis of Copper Iron Sulfide (Bornite) Nanoparticles

A solution was prepared by dissolving Cu(II)(acac)$_2$ (262 mg, 1.0 mmol), Fe(III)(acac)3 (71 mg, 0.2 mmol), and elemental sulphur (1.0 mmol, 32 mg or 1.6 mmol, 51 mg) in 1-dodecanethiol (6.7 mL) and oleic acid (13.3 mL) in a 3-neck round bottom flask equipped with a reflux condenser. The reaction flask was purged with $N_2$(g) for a minimum of 20 min before heating commenced. The solution was heated to 180° C., and maintained at this temperature for a period of one hour. After the solution was cooled to room temperature, the precipitate was centrifuged at 6000 rpm for 10 min in a 50 mL plastic centrifuge tube. The supernatant was then decanted, and the precipitate resuspended in a THF/acetone solution (1:20 v/v). Centrifugation, decanting of the supernatant, followed by resuspension was repeated (2×). Variations on this procedure included changing the temperature to 130° C. and 260° C.

Example 3

Synthesis of Copper Aluminum Sulfide (Chalcopyrite) Nanoparticles

Copper (II) acetylacetonate (0.5 mmol), aluminum (III) acetylacetonate (0.5 mmol), and 1 mmol sulfur were combined in a round bottom flask under an inert atmosphere. Diphenyl ether (10 mL) along with 1 mL 2,2'-thiodiethanethiol were then added to the flask. The flask was then heated to 200° C. while stirring and remained there for one hour. After cooling, the particles were centrifuged out and cleaned using acetone, hexane, and methanol. He particles were identified by Powder X-Ray Diffraction, UV-vis, Transmission Electron Microscopy, and Scanning Electron Microscopy.

Example 4

Synthesis of α- and γ-Chalcocite Nanoparticles by Iron-Induced Stabilization Cu(acac)2 (0.52680 g, 2.01 mmol), Fe(III)(acac)3 (0.03591 g, 0.10 mmol), and sulfur (0.03275 g, 1.02 mmol) were added to a 3-neck, 50 mL round bottom flask equipped with a reflux condenser and stir bar. Oleylamine (20 mL) was added and the reaction vessel was purged with argon gas for 20 minutes with stirring before heating commenced. The reaction was held at 200° C. for 1 hour, then 260° C. for 1 hour. The reaction was cooled to room temperature and centrifuged at 6000 rpm for 10 min in a 50 mL centrifuge tube. The precipitate was suspended in THF, precipitated with acetone, and then centrifuged to purify the particles. To ensure removal of reactants, the precipitate was again suspended in THF, precipitated with acetone, and then centrifuged to purify the particles.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A process for the phase-controlled synthesis of ternary and quaternary mixed-metal sulfide nanoparticles comprising the steps of (a) mixing in a high-boiling organic solvent and under an inert atmosphere a molar equivalent of a soft metal ion complex; 0.1 to 20 molar equivalents of a hard metal ion complex; and 0.1 to 10 molar equivalents of sulfur;

(b) adding a complexing ligand selected from the group consisting of bidentate, tridentate, and tetradentate ligands; and (c) stirring and heating the mixture at about 80° C. to 300° C. under an inert atmosphere for 0.1 to 12 hours;

wherein said soft metal ion incorporated in the mixed-metal sulfide nanoparticles is selected from the group consisting of $Cu^+$, $Ag^+$, $Ni^{2+}$, $Pb^{2+}$, $Zn^{2+}$, $Cd^{2+}$, and $Hg^{2+}$, wherein said hard metal ion is selected from the group consisting of $Sc^{3+}$, $Ti^{3+}$, $Ti^{4+}$, $V^{3+}$, $V^{5+}$, $Cr^{3+}$, $Cr^{2+}$, $Mn^{2+}$, $Mn^{3+}$, $Fe^{3+}$, $Co^{3+}$, $Al^{3+}$, $Ga^{3+}$, $In^{3+}$, $Si^{4+}$, $Ge^{4+}$, $Sn^{4+}$, and $Pb^{4+}$, and whereby said ternary and quaternary mixed-metal sulfide nanoparticles are produced.

2. The process of claim 1, wherein the complexing ligand is selected from the group consisting of

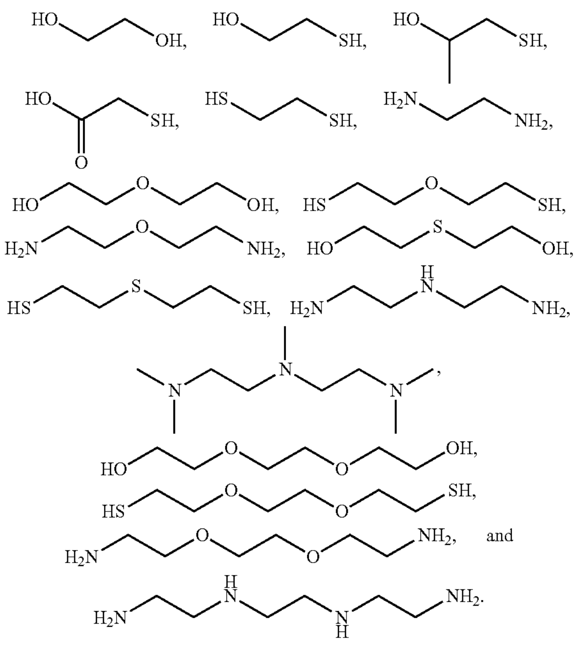

3. The process of claim 2, wherein said hard metal ion is selected from the group consisting of $Cr^{3+}$, $Mn^{2+}$, $Fe^{3+}$, $Fe^{2+}$, $Co^{2+}$, $Al^{3+}$, $Tl^{3+}$, $Si^{4+}$, $Ge^{4+}$, and $Sn^{4+}$.

4. The process of claim 3, wherein the soft metal ion is $Cu^+$ and said hard metal ion is selected from the group consisting of, $Fe^{3+}$, $Al^{3+}$, $Sn^{4+}$, and $Si^{4+}$.

5. The process of claim 4, wherein the complexing ligand is 2,2'-thiodiethanethiol.

6. A process for the phase-controlled synthesis of ternary and quaternary mixed-metal copper sulfide nanoparticles comprising the steps of (a) mixing in a high-boiling organic solvent and under an inert atmosphere equimolar amounts of a copper (II) complex; a metal complex of a metal ion selected from the group consisting of $Cr^{3+}$, $Mn^{2+}$, $Fe^{3+}$, $Fe^{2+}$, $Co^{2+}$, $Al^{3+}$, $Tl^{3+}$, $Si^{4+}$, $Ge^{4+}$, and $Sn^{4+}$, and 2 molar equivalents of sulfur;

(b) adding a complexing ligand selected from the group consisting of bidentate, tridentate, and tetradentate ligands; and (c) stirring and heating the mixture at about 80° C. to 300° C. under an inert atmosphere;

wherein said high-boiling solvent is selected from the group consisting of trioctylphosphine oxide, oleylamine, 1-dodecanethiol, oleic acid, diphenyl ether, and mixtures thereof, and whereby said ternary and quaternary mixed-metal copper sulfide nanoparticles are produced.

7. The process of claim 6, wherein the complexing ligand is 2,2'-thiodiethanethiol.

8. The process of claim 7, wherein said hard metal ion is selected from the group consisting of $Fe^{3+}$, $Al^{3+}$, $Si^{4+}$, and $Sn^{4+}$.

9. Mixed-metal copper sulfide nanoparticles prepared by a process comprising the steps of (a) mixing in a high-boiling organic solvent and under an inert atmosphere equimolar amounts of a copper complex and a complex of at least one hard-metal ion, (b) heating the mixture to about 80° C. to 300° C., and (c) injecting a solution of an equivalent of sulfur and heating the mixture about 280° C. for at least one hour, wherein said hard-metal ion is selected from the group consisting of $Fe^{3+}$, $Al^{3+}$, $Si^{4+}$, and $Sn^{4+}$, and wherein the high-boiling organic solvent is trioctylphosphine oxide, oleylamine, or dodecanethiol.

10. Mixed-metal copper sulfide nanoparticles of claim 9, wherein said copper complex is copper(II) acetylacetonate and said hard-metal complex is tin acetylacetonate dichloride.

11. Mixed-metal copper sulfide nanoparticles of claim 9 having the formula $Cu_4SnS_4$, wherein said organic solvent is trioctylphosphine.

12. Bornite nanoparticles prepared by a phase-controlled process comprising the steps of (a) mixing under an inert atmosphere one molar equivalent of copper (II) acetylacetonate, 0.2 molar equivalents of iron (III) acetylacetonate, and 1.0 to 3.0 molar equivalents of sulfur in a dodecanethiol/oleic acid solvent mixture, and (b) heating the mixture in the range of about 130 to 260° C. for about one hour.

13. Bornite nanoparticles of claim 12 having the high polymorph form, wherein said mixture is heated at about 130° C. during process step (b).

14. Bornite nanoparticles of claim 12 having the low polymorph form, wherein said mixture is heated at about 260° C. during process step (b).

15. Bornite nanoparticles of claim 12 having the low polymorph form, wherein said mixture comprises 1.6 to 3.0 molar equivalents of sulfur, and wherein said mixture is heated at about 180° C.

16. Bornite nanoparticles of claim 12 having the high polymorph form, wherein said mixture comprises 1 molar equivalent of sulfur, and wherein said mixture is heated at about 180° C.

17. A process for the phase-controlled synthesis of stabilized chalcocite ($Cu_2S$) nanoparticles comprising the steps of (a) mixing under an inert atmosphere 2 molar equivalents of a copper (II) acetylacetonate, 1 molar equivalent of sulfur, and 0.01 to 0.10 molar equivalents of iron (III) acetylacetonate in oleylamine, and (b) heating the mixture at about 200 to 260° C. for at least one hour, whereby said stabilized chalcocite nanoparticles are produced.

18. The process of claim 17, wherein 2 molar equivalents of a copper (II) acetylacetonate, 1 molar equivalent of sulfur, and 0.05 to 0.10 molar equivalents of iron (III) acetylacetonate are mixed in oleylamine and whereby stabilized tetragonal chalcocite ($\gamma$-$Cu_2S$) nanoparticles are produced.

19. The process of claim 17, wherein 2 molar equivalents of a copper (II) acetylacetonate, 1 molar equivalent of sulfur, and 0.01 molar equivalents of iron (III) acetylacetonate are mixed in oleylamine, whereby stabilized monoclinic chalcocite ($\alpha$-$Cu_2S$) nanoparticles are produced.

20. A process for the phase-controlled synthesis of stabilized tetragonal chalcocite ($\gamma$-$Cu_2S$) nanoparticles comprising the steps of (a) mixing under an inert atmosphere 2 molar equivalents of a copper (II) acetylacetonate, 1 molar equivalent of sulfur, and 0.01 to 0.10 molar equivalents of aluminum (III) acetylacetonate in 1-dodecanethiol/oleic acid solvent mixture, and (b) heating the mixture at about 200 to 260° C. for at least one hour, whereby said stabilized tetragonal chalcocite ($\gamma$-$Cu_2S$) nanoparticles are produced.

21. A kit of reagents for facilitating the production of ternary and quaternary mixed-metal copper sulfide nanoparticles, said nanoparticles comprising copper ion, sulfur, and at least one hard metal ion selected from the group consisting of $Sc^{3+}$, $Ti^{3+}$, $Ti^{4+}$, $V^{3+}$, $V^{5+}$, $Cr^{3+}$, $Cr^{2+}$, $Mn^{2+}$, $Mn^{3+}$, $Fe^{3+}$, $Co^{3+}$, $Al^{3+}$, $Ga^{3+}$, $In^{3+}$, $Si^{4+}$, $Ge^{4+}$, $Sn^{4+}$, and $Pb^{4+}$, said kit comprising:

(a) a container of reagent comprising an activating ligand for enhancing the reactivity of the hard metal ion, wherein said activating ligand is selected from the group consisting of I–, Br–, 1,2-ethanedithiol, 2,2'-thiodiethanethiol, t -butyl alcohol, thioacetic acid, thioacetamide, and HSR wherein R is alkyl, (b) a container of reagent comprising a complexing ligand for moderating the activity of the copper ion, wherein said complexing ligand is selected from the group consisting of

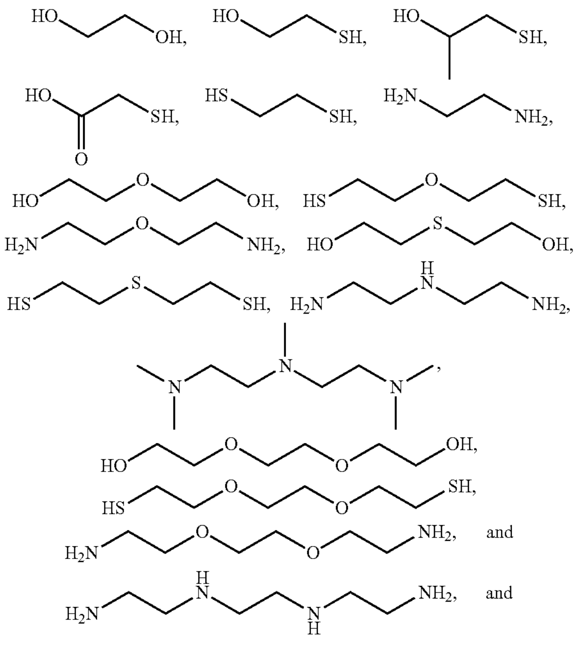

(c) a container of a high-boiling organic solvent selected from the group consisting of trioctylphosphine oxide, oleylamine, 1-dodecanethiol, oleic acid, diphenyl ether, and mixtures thereof.

22. The kit of claim 21, wherein the activating ligand for the hard metal ion is 2,2'-thiodiethanethiol.

23. The kit of claim 21, wherein the complexing ligand for the soft metal ion is 2.2'-thiodiethanethiol.

* * * * *